United States Patent
Kohli

(10) Patent No.: US 11,263,683 B2
(45) Date of Patent: Mar. 1, 2022

(54) SYSTEM AND METHODS FOR INVOKING ANCILLARY SERVICES BASED ON DIGITAL WALLET EVENTS

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 396 days.

(21) Appl. No.: 16/125,142

(22) Filed: Sep. 7, 2018

(65) Prior Publication Data

US 2020/0082455 A1    Mar. 12, 2020

(51) Int. Cl.
*G06Q 30/06* (2012.01)
*G06Q 30/02* (2012.01)
(Continued)

(52) U.S. Cl.
CPC ......... *G06Q 30/0631* (2013.01); *G06Q 10/02* (2013.01); *G06Q 20/407* (2013.01);
(Continued)

(58) Field of Classification Search
CPC .. G06Q 10/02; G06Q 20/3224; G06Q 20/405; G06Q 20/407; G06Q 30/0253;
(Continued)

(56) References Cited

U.S. PATENT DOCUMENTS 7,236,976 B2    6/2007   Breitenbach et al.
7,693,778 B2 *  4/2010   Nafeh .................... G06Q 40/04
                                                      705/37
(Continued)

FOREIGN PATENT DOCUMENTS

EP    1842151 A2    10/2007
WO    2006081436 A2    8/2006

OTHER PUBLICATIONS

Quintos, "Maxing Credit Card Benefits Using Location Based Data," IP.com Prior Art Database Technical Disclosure, Oct. 29, 2017, 11pp. (Year: 2017).*

*Primary Examiner* — Adam L Levine
(74) *Attorney, Agent, or Firm* — Armstrong Teasdale LLP

(57) ABSTRACT

An event servicing (ES) computing device for targeting ancillary merchants based on wallet events is provided. The ES computing device receives primary purchase data for a primary purchase made by a user with a primary merchant, and determines and displays to the user one or more secondary merchants based at least in part on the primary purchase data. The ES computing device further receives secondary purchase data for at least one secondary purchase made by the user from the one or more secondary merchants and determines whether the user has requested to cancel the primary purchase. When the user has requested to cancel the primary purchase, the ES computing device automatically cancels the at least one secondary purchase. When the user has not requested to cancel the primary purchase, the ES computing device processes payment transactions for the primary purchase and the at least one secondary purchase.

20 Claims, 12 Drawing Sheets

(51) Int. Cl.
*G06Q 10/02* (2012.01)
*G06Q 20/40* (2012.01)

(52) U.S. Cl.
CPC ..... *G06Q 30/0253* (2013.01); *G06Q 30/0255* (2013.01); *G06Q 30/0641* (2013.01)

(58) Field of Classification Search
CPC ..... G06Q 30/0255; G06Q 30/06–0645; G06Q 30/08; G06Q 50/01
See application file for complete search history.

(56) References Cited

U.S. PATENT DOCUMENTS

| | | | |
|---|---|---|---|
| 8,275,672 B1 * | 9/2012 | Nguyen | G06Q 30/0613 705/26.41 |
| 8,315,919 B1 | 11/2012 | Perrochon et al. | |
| 9,317,849 B2 | 4/2016 | Pitroda et al. | |
| 9,665,888 B2 | 5/2017 | Depasquale et al. | |
| 9,922,381 B2 | 3/2018 | Isaacson et al. | |
| 10,037,420 B1 | 7/2018 | Ibrahim et al. | |
| 10,037,526 B2 | 7/2018 | Campos | |
| 10,521,851 B2 * | 12/2019 | Kurnit | G06Q 30/0619 |
| 2002/0087894 A1 | 7/2002 | Foley et al. | |
| 2002/0133467 A1 | 9/2002 | Hobson et al. | |
| 2004/0039659 A1 * | 2/2004 | Niwa | G06Q 30/02 705/26.1 |
| 2005/0246278 A1 | 11/2005 | Gerber et al. | |
| 2006/0046740 A1 | 3/2006 | Johnson | |
| 2006/0218050 A1 * | 9/2006 | Walker | G06Q 30/00 705/26.1 |
| 2008/0054067 A1 * | 3/2008 | Ingle | G06Q 30/02 235/380 |
| 2010/0228628 A1 | 9/2010 | Dufour | |
| 2010/0305848 A1 | 12/2010 | Stallman | |
| 2013/0159154 A1 | 6/2013 | Purves et al. | |
| 2013/0238370 A1 | 9/2013 | Wiseman et al. | |
| 2013/0304642 A1 | 11/2013 | Campos | |
| 2014/0095221 A1 | 4/2014 | Lore et al. | |
| 2015/0026049 A1 | 1/2015 | Theurer et al. | |
| 2015/0199622 A1 | 7/2015 | Hamblett et al. | |
| 2015/0356693 A1 | 12/2015 | Wiseman et al. | |
| 2016/0253731 A1 * | 9/2016 | Ketchel, III | G06Q 20/10 705/26.5 |

* cited by examiner

SYSTEM AND METHODS FOR INVOKING ANCILLARY SERVICES BASED ON DIGITAL WALLET EVENTS

BACKGROUND

This disclosure relates generally to targeted ancillary services, and more specifically to network-based systems and methods for invoking secondary goods and/or services, based on digital wallet events or purchases.

Certain purchases, particularly event-based purchases, often necessitate the subsequent purchase of ancillary (or secondary) goods and services. For example, when a user purchases concert tickets, he or she may also wish to hire a babysitter for the evening, make dinner reservations, find parking, and/or schedule transportation services to the concert. The user may require or desire specific ancillary goods/services based on the location of the concert in relation to the location of the user's residence. Typically, the user is responsible for finding and scheduling each ancillary good/service as a separate task and transaction. In the same way, the user will be responsible for cancelling each ancillary good/service in the event that he/she has a change in plans and must cancel the primary purchase (and consequently all related purchases). Accordingly, an event-based merchant targeting system that easily allows users to select and purchase secondary goods and services based on a primary purchase (such as an event-based purchase) is needed where secondary purchases, as well as cancellation services for both primary and secondary purchases, are integrated as part of the primary purchase transaction.

BRIEF DESCRIPTION OF THE DISCLOSURE

In one aspect, an event servicing computing device is provided. The event servicing computing device includes a processor in communication with a memory. The processor programmed to receive primary purchase data for a primary purchase made by a user, wherein the primary purchase is made with a primary merchant, and to determine one or more secondary merchants based at least in part on the primary purchase data. The processor is also programmed to display to the user the one or more secondary merchants, the one or more secondary merchants providing one or more secondary purchase options. The processor is further programmed to receive secondary purchase data for at least one secondary purchase made by the user from the one or more secondary merchants, and determine whether the user has requested to cancel the primary purchase. When the user has requested to cancel the primary purchase, the processor is programmed to cancel the primary purchase and the at least one secondary purchase. When the user has not requested to cancel the primary purchase, the processor is programmed to process payment transactions for the primary purchase and the at least one secondary purchase.

In another aspect, a method for providing event-based targeted merchants is provided. The method is performed using an event servicing computing device including a processor in communication with a memory. The method includes receiving primary purchase data for a primary purchase made by a user, wherein the primary purchase is made with a primary merchant, and determining one or more secondary merchants based at least in part on the primary purchase data. The method also includes displaying to the user the one or more secondary merchants, the one or more secondary merchants providing one or more secondary purchase options. The method further includes receiving secondary purchase data for at least one secondary purchase made by the user from the one or more secondary merchants, and determining whether the user has requested to cancel the primary purchase. When the user has requested to cancel the primary purchase, the method includes cancelling the primary purchase and the at least one secondary purchase. When the user has not requested to cancel the primary purchase, the method includes processing payment transactions for the primary purchase and the at least one secondary purchase.

In yet another aspect, a non-transitory computer-readable storage medium having computer-executable instructions embodied thereon is provided. When executed by an event servicing (ES) computing device including at least one processor coupled to a memory, the computer-executable instructions cause the ES computing device to receive primary purchase data for a primary purchase made by a user, wherein the primary purchase is made with a primary merchant. The computer-executable instructions also cause the ES computing device to determine one or more secondary merchants based at least in part on the primary purchase data, and to display to the user the one or more secondary merchants, wherein the one or more secondary merchants provide one or more secondary purchase options. The computer-executable instructions further cause the ES computing device to receive secondary purchase data for at least one secondary purchase made by the user from the one or more secondary merchants, and to determine whether the user has requested to cancel the primary purchase. When the user has requested to cancel the primary purchase, the computer-executable instructions cause the ES computing device to cancel the primary purchase and the at least one secondary purchase. When the user has not requested to cancel the primary purchase, the computer-executable instructions cause the ES computing device to process payment transactions for the primary purchase and the at least one secondary purchase.

BRIEF DESCRIPTION OF THE DRAWINGS

FIGS. 1-8 show example embodiments of the methods and systems described herein.

FIG. 1 is an example multi-party payment card processing system in data communication with an event servicing (ES) computing device.

FIG. 2 is an example of an event-based merchant targeting (EBMT) system including the ES computing device.

FIG. 5 illustrates an example configuration of a remote device for use in the system shown in FIG. 2.

FIG. 6 illustrates an example configuration of a server system for use in the system shown in FIG. 2.

FIG. 7 is a flowchart of an example process for providing an event-based merchant targeting system using the system shown in FIG. 2.

FIG. 8 is a diagram of components of an example computing device that may be used in the EBMT system shown in FIG. 2.

Figure 1:
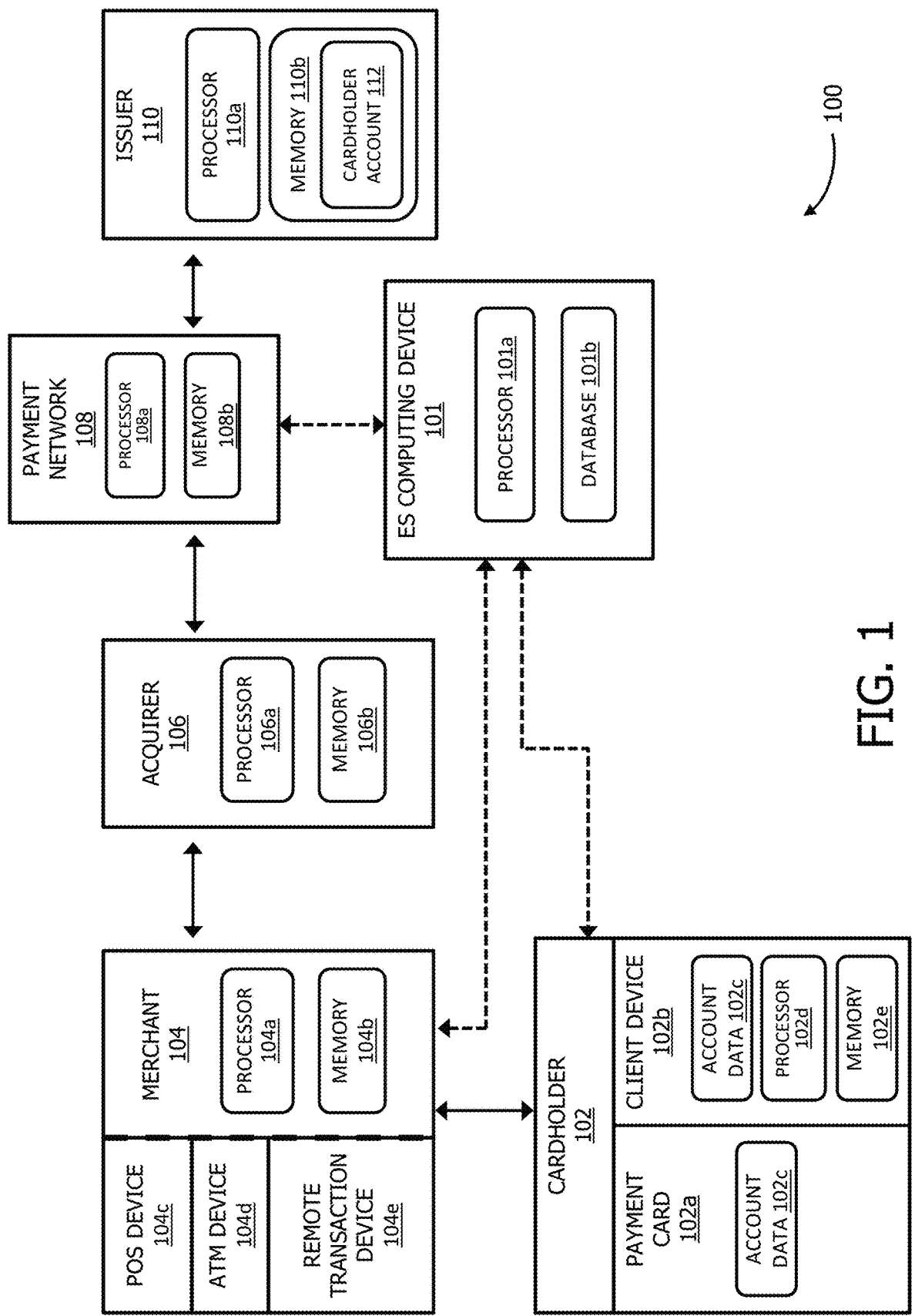

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

The embodiments described herein include an event-based merchant targeting (EBMT) system, an event servicing (ES) computing device, and methods for providing an EMBT system that targets secondary merchants to provide ancillary goods and services based on a primary purchase made at a primary merchant.

In the exemplary embodiment, an event-based merchant targeting system includes a primary merchant (e.g., a supplier or seller of a primary purchase), a user (e.g., a consumer or buyer), and at least one secondary merchant (e.g., a supplier or seller of a secondary purchase). Merchants (prior to being categorized as primary or secondary) enroll or register themselves with the system (e.g., with the ES computing device). In some embodiments, users also register with the system. When a user makes an initial purchase (such as an event-based purchase) with a merchant, then that merchant is considered to be the primary merchant in this particular instance, and the purchase is considered to be the primary purchase. The system then targets/determines one or more secondary merchants based at least in part on data associated with the primary purchase. Secondary merchants are merchants that are registered with the system and whose goods/services relate in some way to the primary purchase of the user. The secondary merchant(s) can also be determined based on a location of the user (e.g., a geo-IP location). The secondary merchant(s) can be determined further based on a profile of the user, for example, in cases when the user has registered with the system. The secondary merchants are displayed to the user and provide options to the user for purchasing goods and/or services associated with the primary purchase. Purchases made with a secondary merchant are considered to be secondary purchases. The user can select and make one or more secondary purchases via the system.

The system is additionally configured to determine whether the user has requested to cancel the primary purchase. In a case when the user requests to cancel the primary purchase, the system will cancel the primary purchase as well as automatically cancel any and all secondary purchases that were made by the user and associated with the particular primary purchase that is now being cancelled. The system will cancel the primary and secondary purchases by cancelling transmission of a payment authorization request message for both the primary and secondary purchases. In the case where the user does not request to cancel the primary purchase, the system proceeds to process payment transactions (over a payment processing network) for the primary and secondary purchases. However, there is currently no system capable of providing a purchasing experience to a user that includes accessibility to targeted secondary merchants, the ability to make secondary purchases with those targeted secondary merchants, and cancellation and payment processing of both primary and secondary purchases all as an integrated part of the primary purchase transaction. The systems and methods described herein resolve this deficiency.

In the example embodiment, the EBMT system includes an event servicing (ES) computing device that includes and/or is in communication with a primary merchant computing device, at least one secondary merchant computing device, a user (e.g., a consumer/cardholder) computing device, and a payment network. The ES computing device is configured to (i) receive primary purchase data for a primary purchase made by a user with a primary merchant, (ii) determine one or more secondary merchants based at least in part on the primary purchase data, (iii) display to the user the one or more secondary merchants, the one or more secondary merchants providing one or more secondary purchase options, (iv) receive secondary purchase data for at least one secondary purchase made by the user from the one or more secondary merchants, (v) determine that the user has requested to cancel the primary purchase and cancel the primary purchase and the at least one secondary purchase, and (vi) determine that the user has not requested to cancel the primary purchase and process payment transactions for the primary purchase and the at least one secondary purchase.

The ES computing device is a specifically configured computing device that is capable of functioning as described herein, including a dedicated computing device associated solely with the EBMT system. The ES computing device includes at least one processor in communication with at least one memory.

The EBMT system further includes a database in wired and/or wireless communication with the ES computing device. In some embodiments, the database is a centralized database that is integral to the ES computing device, or in alternative embodiments the database is a separate component and external to the ES computing device. The database is accessible to the ES computing device and is configured to store and/or otherwise maintain a variety of information, as described further herein. For example, the database may store registration modules and verification rules, registered merchant listings, registered user listings, registered merchant profiles, registered user profiles, secondary merchant determination rules, and payment processing and cancellation rules and/or any other information. The database is configured to store data to more efficiently provide targeted secondary merchants and secondary purchase options to facilitate easy user selection of ancillary goods/services. Subsequently, based on the most recently selected secondary purchases, the secondary merchant availability (wherever applicable) may be updated and re-cached to the database.

According to one or more example embodiments, the event servicing (ES) computing device enables merchants to enroll or register with the system. Registration may include creation of merchant profiles. Merchant profiles may include various merchant-related data, such as name, address, locations, and contact information. When targeted as an ancillary or secondary merchant, registered merchant-related data included in the merchant profile may be displayed to a user along with purchase options (e.g., categories as well as of products/services being offered for sale) provided by that merchant. Registration with the system provides the merchant with a tailored advertising platform that may be unavailable to unregistered merchants.

In some embodiments, merchant registration may further include a verification process. For instance, the ES computing device may verify the legitimacy of the merchant's business. Verification may include business address checks and location checks. Additionally or alternatively, verification may include comparing merchant-submitted data with merchant data in, for example, the Better Business Bureau data warehouse, or other data warehouse to see if the merchant is a valid merchant. Verification may also include service provider background checks and driving record checks. Accordingly, only merchants that pass the verification process will be registered by the ES computing device and have their respective ancillary goods/services offered via the EBMT system. By using the EBMT system, users can have increased confidence in the goods and services being provided because registered merchants have passed the verification process.

In some embodiments, users (e.g., consumers/buyers) may also be enabled to register with the ES computing device. In these embodiments, registered users may create a user profile and input identifying data (such as name, address, etc.) and payment data (such as card/account information) that will be saved in the database associated with the ES computing device and used for payment transactions handled by the ES computing device. In some embodiments, a user profile may be created for the user by an issuer upon issuance of a cardholder account. This issuer-created profile may be used by ES computing device upon user registration with the ES computing device. Registration may include, for example, subscribing to the service(s) provided by ES computing device, downloading an app associated with the service(s) provided by ES computing device, and downloading a digital wallet to be used in conjunction with ES computing device. In some embodiments, registered users may receive discounts, coupons, rebates, rewards, reward points, or other incentives for primary and/or secondary purchases made via the EBMT system. In other embodiments, a user may prefer not to register with ES computing device, and may still be able to utilize the EBMT system for targeted ancillary merchant recommendations and ancillary purchases (e.g., as a 'guest' user without the ancillary/secondary merchant determination being additionally based on a user profile).

In the example embodiment, the ES computing device is configured to receive an event-based primary purchase from a user. For example, the primary purchase is related to a particular event having a designated date and location, and possibly also designated start/end times. In some embodiments, the event-based purchase is related to a group of events. For instance, the primary purchase may be tickets to a concert, sporting event, spa appointment, fundraiser, or social gathering. In other embodiments, the primary purchase is a goods or service purchase that is not event-based. The primary purchase is made by a user from his/her payment account, and in some embodiments, via a digital wallet.

In the example embodiment, the ES computing device is then configured to determine secondary merchants providing ancillary goods/services based on details of the primary purchase (such as the date, time, and location). In some embodiments, secondary merchants are also determined based on a location of the user, such as a geo-IP location. In some embodiments, secondary merchants are further determined based on a profile of the user (which may contain additional data including home address, demographic data, and payment transaction data), such as when the user is registered with ES computing device. For instance, if the primary purchase is concert tickets, the ES computing device may use the concert venue to target nearby restaurants and parking facilities and recommend them to the user. The ES computing device may consider the user's location to determine how far it is from the concert venue to target and recommend overnight accommodations such as hotels. The ES computing device may also consider the user's demographic data, such as if he/she has children, to target and recommend nearby babysitters and childcare services. In embodiments where user profile data is available, a user's payment transaction history may be utilized to rank secondary merchants if the user has interacted with (or frequented) particular merchants. In some embodiments, secondary merchants are determined from among registered merchants only. In other embodiments, secondary merchants may be determined from among both registered and unregistered merchants. In these embodiments, registered merchants may be given priority over unregistered merchants when being recommended to a user.

In the example embodiment, the ES computing device is configured to display the determined/targeted secondary merchants to the user via a user interface. The secondary merchants provide secondary purchase options to the user. In some embodiments, display of specific secondary merchants will be predicated by a query to the user about which ancillary service categories the user wishes to see recommendations for. For instance, the ES computing device may ask the user if he/she wants to make childcare arrangements, make a restaurant reservation, find parking accommodations, schedule overnight accommodations, or arrange transportation services in relation to the primary event-based purchase. In some embodiments, and depending upon the categories selected by the user in response to this query, the ES computing device may push notifications to the determined secondary merchants for availability data and/or for approval to be recommended to the user as a secondary merchant. In some embodiments, merchants may elect upon registration to receive (or not receive) notifications for availability/approval from the ES computing device. As an example, a babysitting service or a transportation service may wish to receive notifications to check babysitter or driver availability, and consequently will only approve being recommended to the user as a secondary merchant if there are available service providers. As another example, a hotel may wish to receive notifications to check room availability, and consequently will only approve being recommended to the user if there are rooms available for the user to reserve. In other embodiments, the ES computing device may send notifications to all targeted secondary merchants, or alternatively only to secondary merchants that belong to certain service categories. The ES computing device will subsequently show specific secondary merchants based on the user's selections and the merchants' availability and/or approval. In some embodiments, the ES computing device will display the specific secondary merchants without pushing notifications or receiving availability and/or approval from the targeted secondary merchants. In some embodiments, additional filtering and/or sorting criteria may be provided to the user via the user interface when the user views the displayed secondary merchants.

In other embodiments, the determined secondary merchants will be displayed without querying the user for category preferences. This may be done automatically for each primary purchase, according to merchant preference obtained upon registration, or according to certain rules of the ES computing device. For instance, if the concert venue is more than 100 miles (or some other distance, according to rules stored by the ES computing device) from the user's home address, the ES computing device will automatically display targeted secondary merchants that provide overnight accommodations.

In the example embodiment, the ES computing device is further configured to receive at least one secondary purchase from at least one of the displayed secondary merchants. The secondary purchases made by the user may be grouped together with the primary purchase, and both the primary and secondary purchases may be collectively displayed to the user for ease of organization and planning. Information including purchase details, receipts, tickets, passes, reservations, confirmation numbers, etc., may be accessed by the user from this collective purchase display. Secondary purchases may be individually edited or cancelled according to user preference. The user's payment account will be debited/credited accordingly to reflect the most current status of secondary purchases.

Further, the ES computing device is configured to determine whether or not the user has requested to cancel the primary purchase. If the user requests to cancel the primary purchase, then the ES computing device will cancel the collective purchases (e.g., the primary purchase as well as each secondary purchase). This feature is particularly useful for a user/consumer when something comes up at the last minute and the user must cancel his/her plans. Collective purchase cancellation includes cancelling payment transaction processing for the primary purchase and each secondary purchase made by the user. In some embodiments, cancellation of the primary and secondary purchases includes crediting/refunding the user's payment account for payment transactions that may have already been processed. In some embodiments, cancellation also includes sending notifications to each merchant (primary and secondary) regarding the cancellation on behalf of the user. If the user does not request to cancel the primary purchase, then the ES computing device will process the payment transactions for the primary purchase and the secondary purchase(s).

The EBMT system described herein, including the ES computing device, provides an event-based merchant targeting system through which targeted ancillary merchants are determined based on a primary event-based purchase, secondary/ancillary purchases are integrated into the primary purchase experience, and collective purchase management and cancellation options are provided.

The methods and systems described herein may be implemented using computer programming or engineering techniques including computer software, firmware, hardware, or any combination or subset therefor. At least one of the technical problems addressed by this system includes: (i) lack of targeted ancillary service recommendations upon making a primary event-based purchase; (ii) lack of ancillary service targeting based on location and/or user profile data; (iii) inefficient use of time for user/consumer when searching, browsing, analyzing, selecting, and organizing ancillary services; (iv) lack of real-time, collective cancellation for primary and secondary purchases; (v) lack of user/consumer confidence when merchants are not registered and/or verified; and (vi) lack of a centralized database for storing specialized data-rich user profiles and secondary merchant data.

The technical effect of the systems and methods described herein is achieved by performing at least one of the following steps: (i) receiving primary purchase data for a primary purchase made by a user, the primary purchase made with a primary merchant; (ii) determining one or more secondary merchants based at least in part on the primary purchase data; (iii) displaying to the user the one or more secondary merchants, the one or more secondary merchants providing one or more secondary purchase options; (iv) receiving secondary purchase data for at least one secondary purchase made by the user from the one or more secondary merchants; and (v) determining whether the user has requested to cancel the primary purchase, wherein: when the user has requested to cancel the primary purchase, cancelling the primary purchase and the at least one secondary purchase, and when the user has not requested to cancel the primary purchase, processing payment transactions for the primary purchase and the at least one secondary purchase.

The resulting technical effect achieved by the systems and methods described herein is at least one of: (i) improved ancillary service recommendations in conjunction with a primary purchase; (ii) ancillary service targeting based on location (e.g., primary purchase event location and/or user geo-IP location) and/or user profile data (e.g., demographics, preferences, purchase history); (iii) more efficient use of user/consumer time for an overall purchase experience that includes a primary purchase and ancillary/secondary purchases; (iv) more efficient delivery options for merchants and users for arranging purchased item delivery; (v) convenient and collective real-time cancellation for primary and ancillary/secondary purchases; (vi) increased user/consumer confidence for making purchases from registered/verified merchants; and (vii) improved storage for user profile data and secondary merchant data.

In one embodiment, a computer program is provided, and the program is embodied on a computer-readable medium. In an example embodiment, the EBMT system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the EBMT system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing an event-based merchant targeting system in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system in data communication with an event servicing (ES) computing device 101. The present disclosure relates to payment card system 100, such as a credit card payment system using the MASTERCARD payment card system payment network 108 (also referred to as an "interchange" or "interchange network"). Mastercard payment card system payment network 108 (including processor 108a and memory 108b) is a proprietary communications standard promulgated by Mastercard International Incorporated for the exchange of financial transaction data between financial institutions that are members of Mastercard International Incorporated. (MASTERCARD is a registered trademark of Mastercard International Incorporated located in Purchase, N.Y.).

In payment card system 100, a financial institution such as an issuer 110 (including processor 110a and memory 110b) issues a payment card for an account, such as a credit card account or a debit card account, to a cardholder 102, who uses the payment card to tender payment for a purchase from a merchant 104 (including processor 104a and memory 104b). Cardholder 102 is representative of payment card 102a, such as a physical payment card storing account data 102c for example on a magnetic stripe and/or chip. Cardholder 102 is also representative of client device 102b. Cardholder client device 102b (including processor 102d and memory 102e) stores cardholder 102 account data 102c, e.g., within a digital wallet.

To accept payment with the payment card, merchant 104 must normally establish an account with a financial institution that is part of the financial payment system. This financial institution is usually called the "merchant bank" or the "acquiring bank" or "acquirer bank" or simply "acquirer". When a cardholder 102 tenders payment for a purchase with a payment card (also known as a financial transaction card), merchant 104 requests authorization from acquirer 106 (including processor 106a and memory 106b) for the amount of the purchase. Such a request is referred to herein as an authorization request message (e.g., ISO® 8583 compliant messages and ISO® 20022 compliant messages). The request may be performed over the telephone, but is usually performed through the use of a point-of-interaction terminal, which reads the cardholder's account data 102c from a magnetic stripe or chip on the payment card and communicates electronically with the transaction processing computers of acquirer 106. Point-of-interaction terminals include point-of-sale (POS) devices 104c, ATM devices 104d, and remote transaction devices 104e that are associated with merchant 104. Alternatively, acquirer 106 may authorize a third party to perform transaction processing on its behalf. In this case, the point-of-interaction terminal will be configured to communicate with the third party. Such a third party is usually called a "merchant processor" or an "acquiring processor."

For card-not-present (CNP) transactions, cardholder 102 provides payment card information or billing data associated with the payment card electronically (e.g., via cardholder client device 102b and/or remote transaction device 104e) to merchant 104. The payment information received by merchant 104 is stored and transmitted to acquirer 106 and/or payment network 108 as part of an authorization request message. In some embodiments, merchant 104 transmits a plurality of authorization request messages together as a "batch" file to acquirer 106 and/or payment network 108.

Using payment card system payment network 108, the computers of acquirer 106 or the merchant processor will communicate with the computers of issuer 110, to determine whether the cardholder's account 112 is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because bankcard associations, such as Mastercard International Incorporated, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 112 is decreased. Normally, a charge is posted immediately to cardholder's account 112. The bankcard association then transmits the approval to the acquiring processor for distribution of goods/services, information, or cash in the case of an ATM.

After a transaction is captured, the transaction is settled between merchant 104, acquirer 106, and issuer 110. Settlement refers to the transfer of financial data or funds between the merchant's account, acquirer 106, and issuer 110 related to the transaction. Usually, transactions are captured and accumulated into a "batch," which is settled as a group.

Throughout the payment transaction process, event servicing (ES) computing device 101 (including processor 101a and database 101b) is in data communication with several other components of system 100, particularly cardholder 102, merchant 104, and network 108. ES computing device 101 is configured to obtain and store cardholder 102 and merchant 104 related data, communicate with network 108 to identify qualifying purchases made by cardholder 102, obtain purchase-related data via network 108, parse purchase-related data from the purchase transaction including merchant 104 related data, analyze purchase and merchant related data in order to determine one or more merchants 104 that can provide applicable ancillary goods/ services, communicate with merchants 104, and communicate with cardholder 102. ES computing device 101 may be configured to perform additional or alternative steps depending on the specific embodiment.

Figure 2:
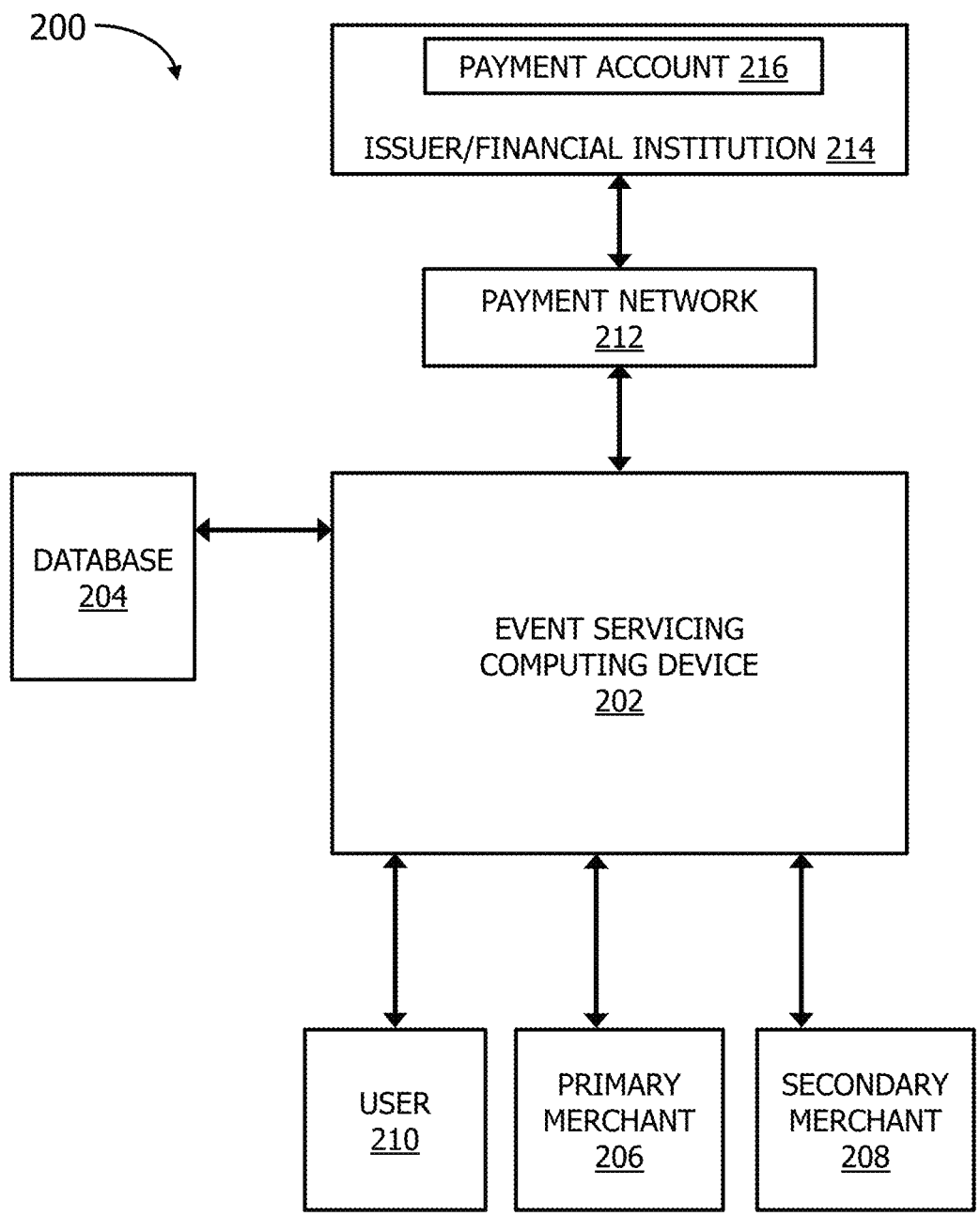

FIG. 2 is a block diagram of an example of an event-based merchant targeting (EBMT) system 200 including an event servicing (ES) computing device 202 (similar to event servicing (ES) computing device 101, shown in FIG. 1). ES computing device 202 includes at least one processor in communication with a memory. ES computing device 202 is in communication with a database (memory) 204, primary merchant computing device(s) 206 (similar to merchant 104, shown in FIG. 1), secondary merchant computing device(s)

208 (also similar to merchant 104, shown in FIG. 1), user computing device(s) 210 (similar to cardholder 102, shown in FIG. 1), and issuer/financial institution 214 via payment network 212. Payment network 212 may be similar to payment network 108 as shown in FIG. 1. Payment network 212 includes at least a payment processor for processing payment transactions. Payment network 212 may further include an issuer computing device (where the issuer is a bank or financial institution associated with a user (e.g., cardholder) and issues payment accounts/cards to the user), an acquirer computing device (where the acquirer is a bank or financial institution associated with a merchant, e.g., a merchant bank), a merchant computing device, and a user/cardholder payment card and/or computing device. Database 204 contains information on a variety of matters, including: registration modules and verification rules, registered merchant listings, registered user listings, registered merchant profiles, registered user profiles, secondary merchant determination rules, and payment processing and cancellation rules and/or any other information. In some embodiments, database 204 is stored on ES computing device 202. In alternative embodiments, database 204 is stored remotely from ES computing device 202 and may be non-centralized. EBMT system 200 is communicatively coupled to system 100 (shown in FIG. 1) to provide data, such as transaction and account data, to EBMT system 200.

In the example embodiment, payment network 212 is configured to receive/transmit transaction data from/to ES computing device 202 to facilitate processing of payment transactions initiated via EBMT system 200. In some embodiments, ES system 202 receives payment data from user 210. To complete a payment transaction, ES computing device may transmit an authorization request message from merchants 206, 208 to payment network 212 and issuer/financial institution 214. Upon approval, issuer/financial institution will transmit the appropriate funds via payment network 212 to ES computing device 202 to apply payment for a primary purchase and at least one secondary purchase from payment account 216 that is associated with user 210. Depending on the embodiment, ES computing device 202 may process or cancel payment transactions for primary and secondary purchases made with primary and secondary merchants, respectively.

In the example embodiment, EBMT system 200 further includes a plurality of client subsystems, also referred to as client/user systems such as primary merchant 206 computing device, secondary merchant 208 computing device, and user (e.g., consumer/buyer) computing device 210. As described in greater detail herein, user 210, primary merchant 206, secondary merchant 208 computing devices may be associated with ES computing device 202 by registering with ES computing device 202. Computing devices 206, 208, 210 are computers including a web browser, such that ES computing device 202 is accessible to user computing devices 206, 208, 210 using the Internet. Computing devices 206, 208, 210 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although one primary merchant 206, one secondary merchant 208, and one user 210 computing device is shown in FIG. 2, it should be understood that EBMT system 200 may include any number of primary merchants 206, secondary merchants 208 and/or user 210 computing devices.

In one embodiment, ES computing device 202 is configured to communicate with a primary merchant 206, one or more secondary merchants 208, and user 210 computing device. Computing devices 206, 208, 210 are configured to display an app, for example, at a user interface (not shown) of computing device 206, 208, 210. Merchants 206, 208 may access the app to register/enroll with the ES computing device 202. In some embodiments, merchants 206, 208 are automatically verified by ES computing device 202 as described above. In certain embodiments, merchants 206, 208 provide merchant-related data such as goods/services available for purchase, to ES computing device 202 to facilitate generation of merchant 206, 208 profiles, which are stored in database 204. In some embodiments, the app providing access to the ES computing device may have inter-app integration functionality, such that the targeted merchant services of the app may be integrated with, for example, location, budgeting, invoicing, or inventory tracking services of another application.

Database 204 is communicatively coupled to ES computing device 202. In other embodiments, database 204 is integrated with ES computing device 202 or payment network 212 (e.g., a payment processor). Database 204 is configured to receive, store, and transmit data for the ES computing device 202. In particular, database 204 may store registration modules and verification rules, registered merchant listings, registered user listings, registered merchant profiles, registered user profiles, secondary merchant determination rules, and payment processing and cancellation rules and/or any other information.

In the illustrated embodiment, ES computing device 202 is in communication with a payment network 212. Payment network 212 is configured to process financial transactions thereover. Payment network 212 is in communication with a plurality of issuers/financial institutions 214 (e.g., banks), although only one issuer 214 is shown for clarity. Financial institution 214 maintains one or more payment accounts 216 associated with a user 210 (e.g., a consumer or buyer), such as a credit card account, debit account, or prepaid account. In some embodiments, ES computing device 202 is integral to payment network 212 and in direct communication with financial institution 214.

Figure 3A:
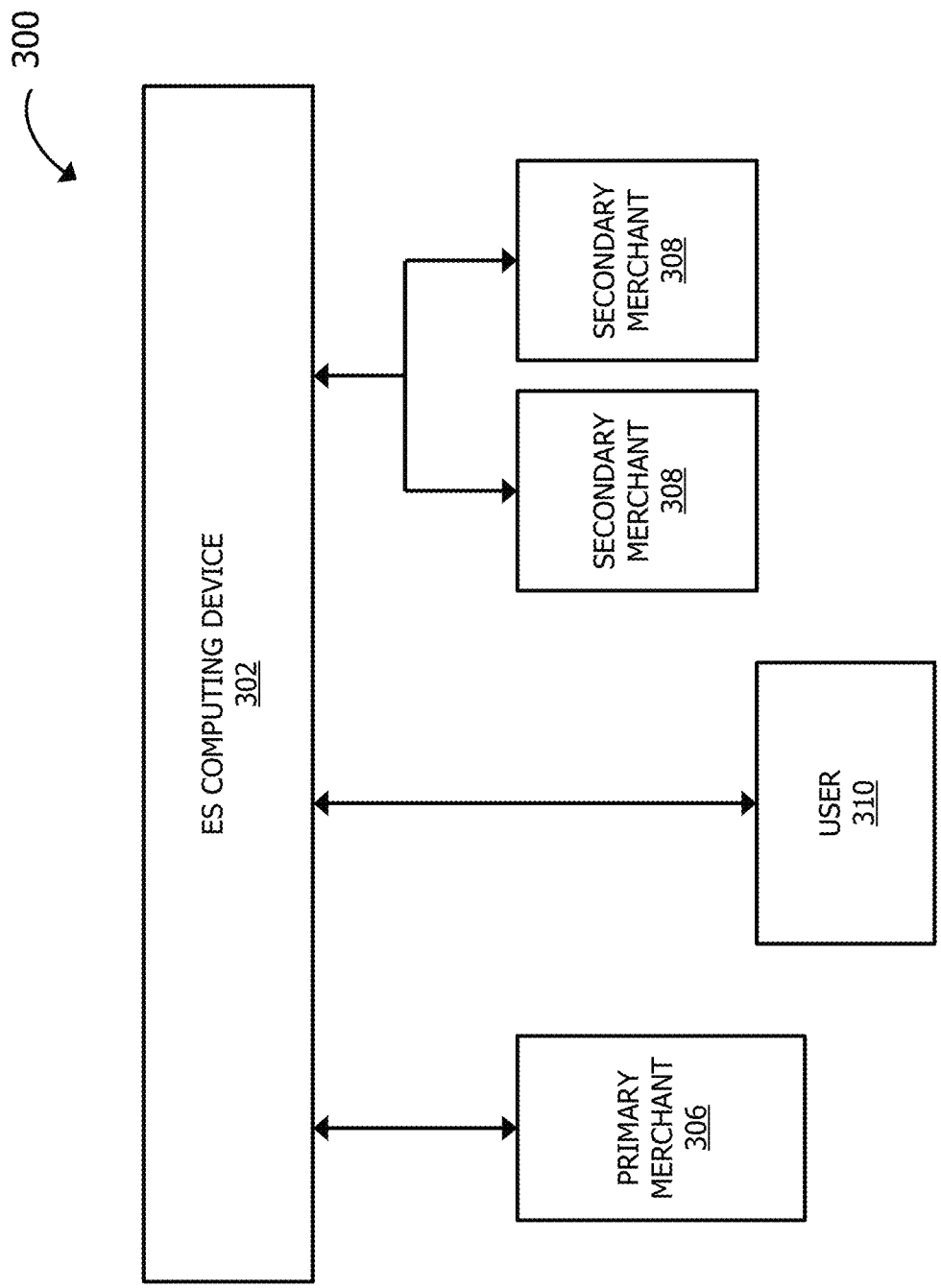
FIG. 3A is an example flow diagram illustrating the flow of data between various components of the EBMT system shown in FIG. 2.

FIG. 3A is an example flow diagram illustrating the general flow of data between various components of the EBMT system 200 (shown in FIG. 2). In particular, FIG. 3 depicts the data flow between ES computing device 302 (similar to ES computing device 202 shown in FIG. 2), user 310 (similar to user 210 shown in FIG. 2), primary merchant 206 (similar to primary merchant 206 shown in FIG. 2), and secondary merchant 308 (similar to secondary merchant 208 shown in FIG. 2). Prior to the flow of data depicted in FIG. 3A, user 310 and secondary merchants 308 have registered with (and in some embodiments, been verified by) ES computing device 302. In some embodiments, primary merchant 306 has also registered with ES computing device 302. In other embodiments, EBMT system 200 may provide additional, fewer, or alternative data and data flow, including those described elsewhere herein.

In the example embodiment, ES computing device 302 receives a primary purchase from user 310, wherein the primary purchase is made with primary merchant 306. Based on data related to the primary purchase (such as location, date, and time of the event for an event-based purchase, and any other relevant data) ES computing device 302 then determines one or more secondary merchants 308, i.e., merchants registered with ES computing device 302 that also provide a service/good related in some way to the primary purchase. For instance, a secondary merchant may be one that provides a good/service in proximity to the primary purchase event location (for example, a restaurant close to a concert venue). In some embodiments, secondary merchants may be further determined based on a location (such as geo-IP location or profile address location) of user 310. In these embodiments, a secondary merchant may be one that provides a good/service in proximity to a home address of the user 310 (for example, a nearby babysitter or childcare service).

Figure 3C:
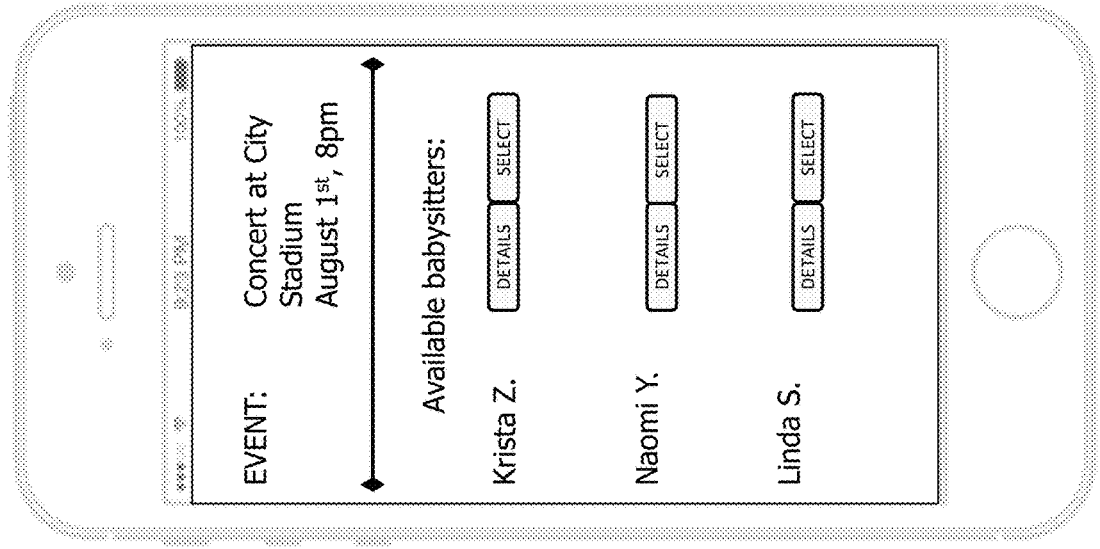
FIG. 3C is a second example screenshot of a software application ("app") of the ES computing device on a user interface illustrating various steps of the data flow shown in FIG. 3A.
Figure 3B:
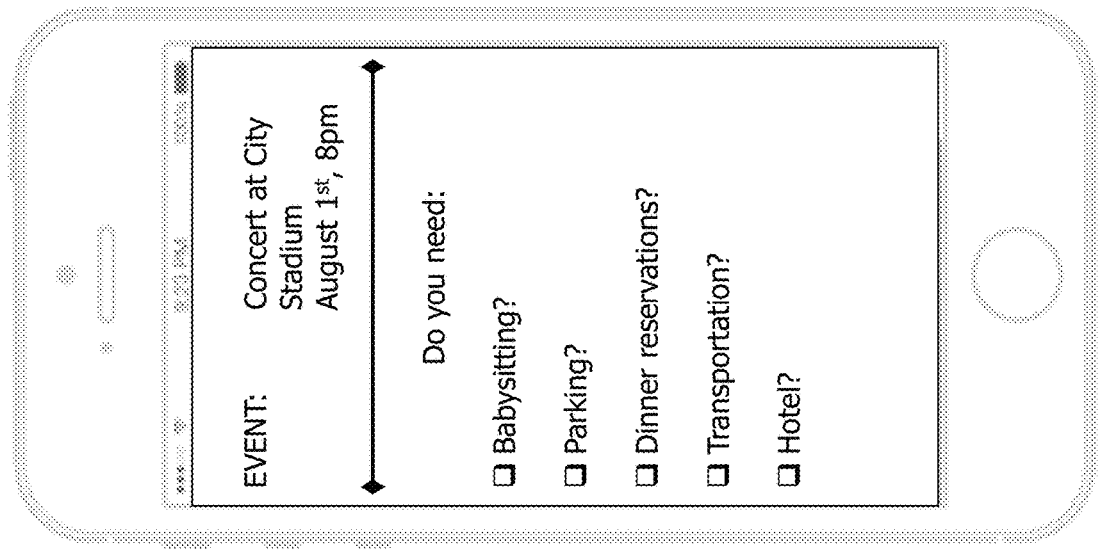
FIG. 3B is a first example screenshot of a software application ("app") of the ES computing device on a user interface illustrating various steps of the data flow shown in FIG. 3A

ES computing device 302 displays the one or more secondary merchants 308 to the user. In some embodiments, displaying the one or more secondary merchants 308 to the user includes first querying the user as to which ancillary services the user wishes to purchase in conjunction with the primary purchase. For example, ES computing device may cause display a list of secondary merchant categories from which user 310 may choose. FIG. 3B is a first example screenshot of a software application ("app") of the ES computing device on a user interface illustrating various steps of the data flow shown in FIG. 3A, and shows categories of ancillary services that may be required or desired by user 310 in conjunction with the primary purchase. In the example embodiment user 310 has made a primary purchase of concert tickets. As shown in FIG. 3B, ES computing device displays a list of ancillary categories from which user 310 may choose to make one or more secondary purchase (such as childcare, parking (in cases when user 310 will drive his/her own vehicle), meal reservations, transportation (in cases when user 310 will not drive his/her own vehicle), and hotel accommodations). User 310 can select any/all of the displayed categories. In some embodiments, ES computing device 302 may push notifications to secondary merchants querying their availability to provide services at/around the date and time of the primary purchase event, and additionally or alternatively if they wish to have their good/service displayed to user 310 as a targeted secondary merchant.

Figure 3E:
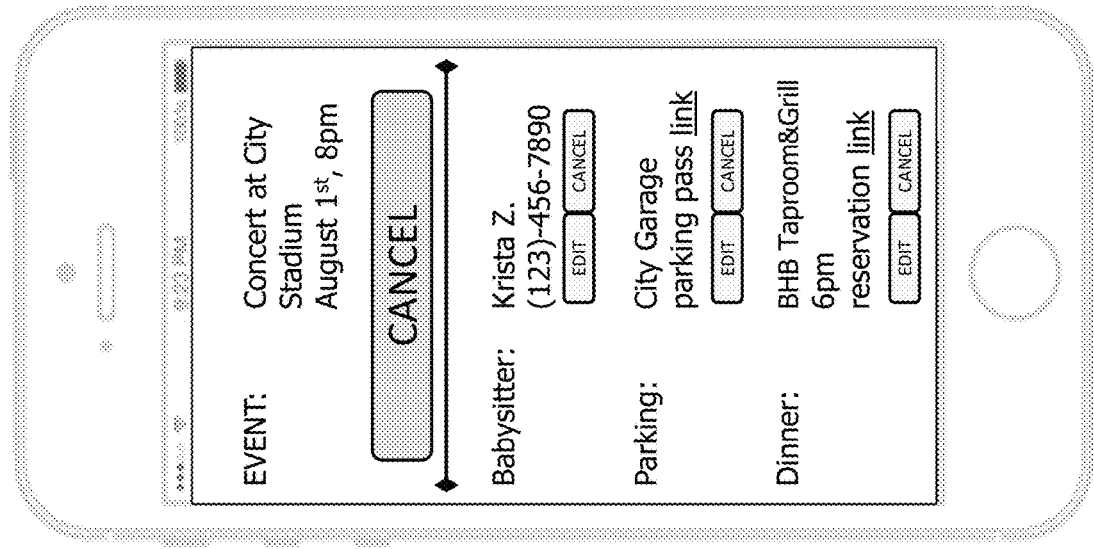
FIG. 3E is a fourth example screenshot of a software application ("app") of the ES computing device on a user interface illustrating various steps of the data flow shown in FIG. 3A.
Figure 3D:
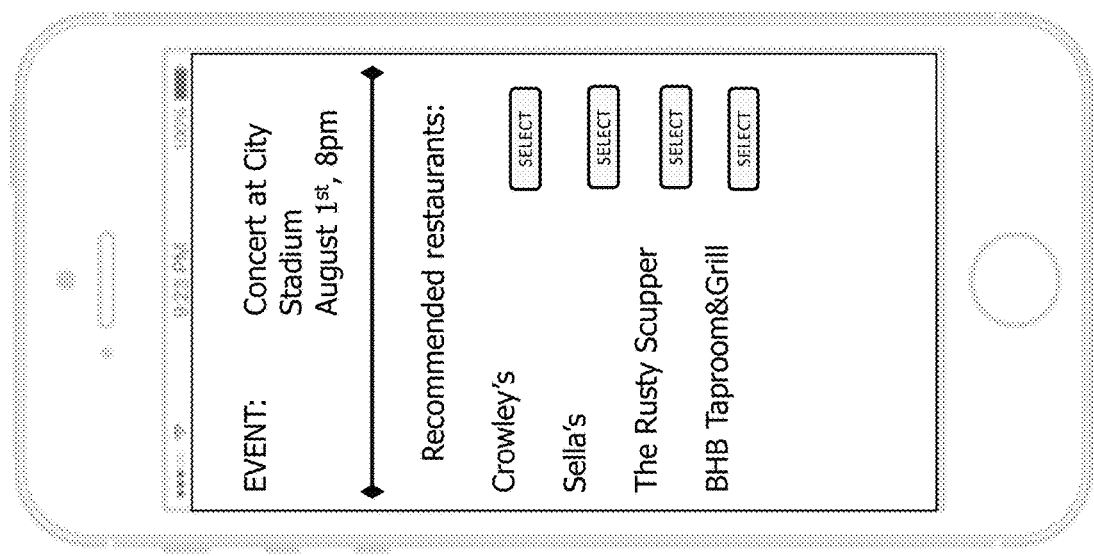
FIG. 3D is a third example screenshot of a software application ("app") of the ES computing device on a user interface illustrating various steps of the data flow shown in FIG. 3A

Upon category selection, ES computing device may then display specific secondary merchants 308 that have been determined/targeted based on primary purchase-related details, as well as user location data and/or user profile data. FIGS. 3C and 3D are second and third example screenshots of a software application ("app") of the ES computing device on a user interface illustrating various steps of the data flow shown in FIG. 3A. In the example embodiment, user 310 has selected babysitting and meal reservation ancillary services. Because ES computing device has determined the one or more secondary merchants 308 based on details of the primary purchase and user profile data, FIG. 3C shows babysitters who are available to babysit at the date and time of the primary purchase event, while FIG. 3D shows restaurants close to the event venue and that user 310 may have visited before (based on user payment transaction history). User 310 can make childcare arrangements and meal reservations based on the targeted/determined secondary merchants 308 displayed by ES computing device 302. Goods and/or services selected and purchased by user 310 from secondary merchant 308 are considered secondary purchases.

In some embodiments, ES computing device 302 bypasses querying user 310 regarding secondary merchant categories and goes straight to displaying the specific secondary merchants 308 that were determined by ES computing device 302 (see FIGS. 3C and 3D). In some embodiments, secondary merchants 308 may be ranked or prioritized according to various factors including, although not limited to, distance from the primary purchase event location, distance from the user's home or business address, distance from the user's geo-IP location, user preference/interaction with merchant 308 based on the user's profile data, browsing data history, and/or payment transaction history.

ES computing device 302 receives at least one secondary purchase from user 310. FIG. 3E is a fourth example screenshot of a software application ("app") of the ES computing device on a user interface illustrating various steps of the data flow shown in FIG. 3A, and gives an aggregate view of the primary and secondary purchases. ES computing device 302 enables user 310 to edit or cancel secondary purchases individually. ES computing device 302 also allows user 310 to collectively cancel primary and secondary purchases. When ES computing device 302 determines that a user has requested to cancel the primary purchase, both the primary purchase and all secondary purchases will be automatically cancelled as well. In this way, user 310 is not required to contact each merchant (either primary or secondary) separately. In some embodiments, ES computing device will cancel payment processing for the primary and secondary transactions by cancelling transmission of a payment authorization message for both the primary and secondary purchases. ES computing device may also send a notification message to each merchant on behalf of user 310. In some embodiments, ES computing device enables user 310 to cancel or edit a primary purchase without automatically cancelling secondary purchases. When ES computing device 302 determines that user 310 has not requested to cancel the primary purchase, ES computing device 302 processes payment transactions for both the primary and secondary purchases via the payment network (such as payment network 212 shown in FIG. 2).

Figure 4A:
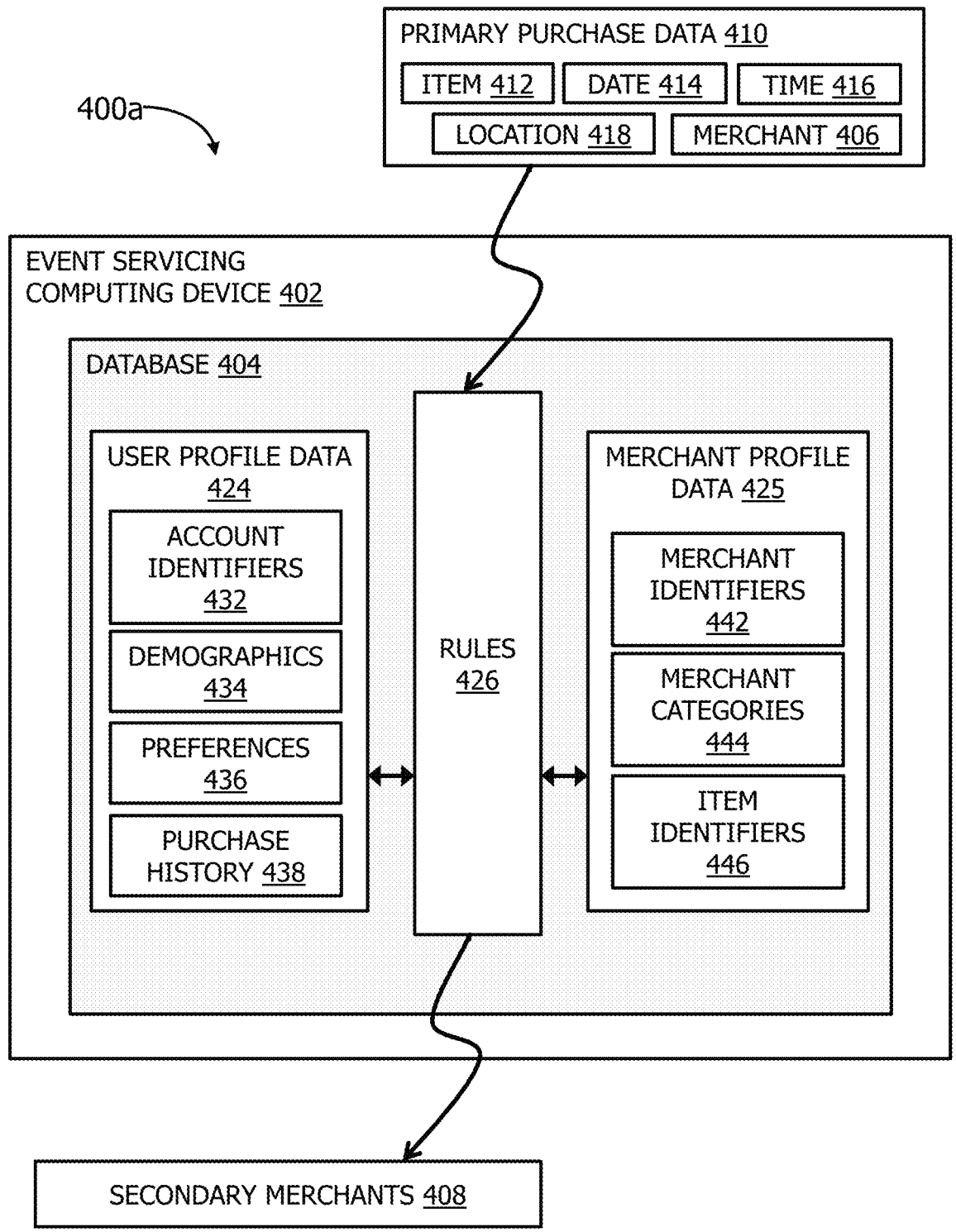
FIG. 4A is an example database structure for use with the ES computing device.

FIG. 4A depicts an example structure 400a of database 404 (similar to database 204 shown in FIG. 2) for use with ES computing device 402 (similar to ES computing device 101, 202, 302 shown in FIGS. 1, 2, and 3, respectively). In some embodiments, the database 404 is a centralized database that is integral to ES computing device 402 as shown in FIG. 4A, or in alternative embodiments database 404 is a separate component that is external and accessible to ES computing device 402. During operation, ES computing device 402 is configured to determine secondary merchants 408 providing ancillary goods/services based on data associated with a primary purchase (e.g., an event-based purchase) as well as based on rules and additional data stored in database 404. Database 404 is configured to store user profile data 424, merchant profile data 425, and rules 426.

User profile data 424 includes account identifiers 432 which are used to identify each payment account (such as payment account 216 shown in FIG. 2) associated with a particular user/cardholder. Account identifiers 432 may be used by ES computing device 402 for identifying purchases that may qualify for secondary merchant recommendations. User profile data 424 may also contain demographics 434 which include demographic data associated with the user. Demographics 434 may include user address or general residential location, age/age group, income range, family size, etc. User profile data may include preferences 436 that are provided by the user, for example, cuisine/restaurant preferences, hotel accommodation preferences, etc. User profile data 424 may further contain purchase history 438 associated with the user. Information contained in user profile data 424 may be stored in database 404 upon user registration with ES computing device 402, and may be provided by the user (such as cardholder 102, user 210, and user 310 shown in FIGS. 1, 2, and 3, respectively) and/or may be provided by the issuer (such as issuer 214 shown in FIG. 2).

Merchant profile data 425 contains information related to registered merchants, including merchant identifiers 442, merchant categories 444, and item identifiers 446. Merchant identifiers 442 are used to identify specific merchants and may be tied to specific categories 444 and/or items 446. Merchant identifiers 442 are also used to identify merchants that qualify for further determination and recommendation of secondary merchants 408. Merchant categories 444 are based on the type of goods/services provided by the merchant. A specific merchant may be categorized according to more than one merchant category 444 if the merchant offers more than one type of good/service for sale. Item identifiers 446 are used to identify specific items (e.g., goods/services) provided by a merchant, as well as to identify items that qualify for further determination and recommendation of secondary merchants 408. Information contained in merchant profile data 425 may be stored in database 404 upon merchant registration with ES computing device 402.

Database 404 further includes rules 426. Rules 426 are used to determine secondary merchants 408 for a qualifying primary purchase based on data 410 associated with the purchase, user profile data 424, and merchant profile data 425. Primary purchase data 410 (e.g., data associated with a primary, event-based purchase) includes data indicating a merchant 406 from which the purchase was made, item related data 412, and event-specific data including date 414, time 416, and location 418.

Figure 4B:
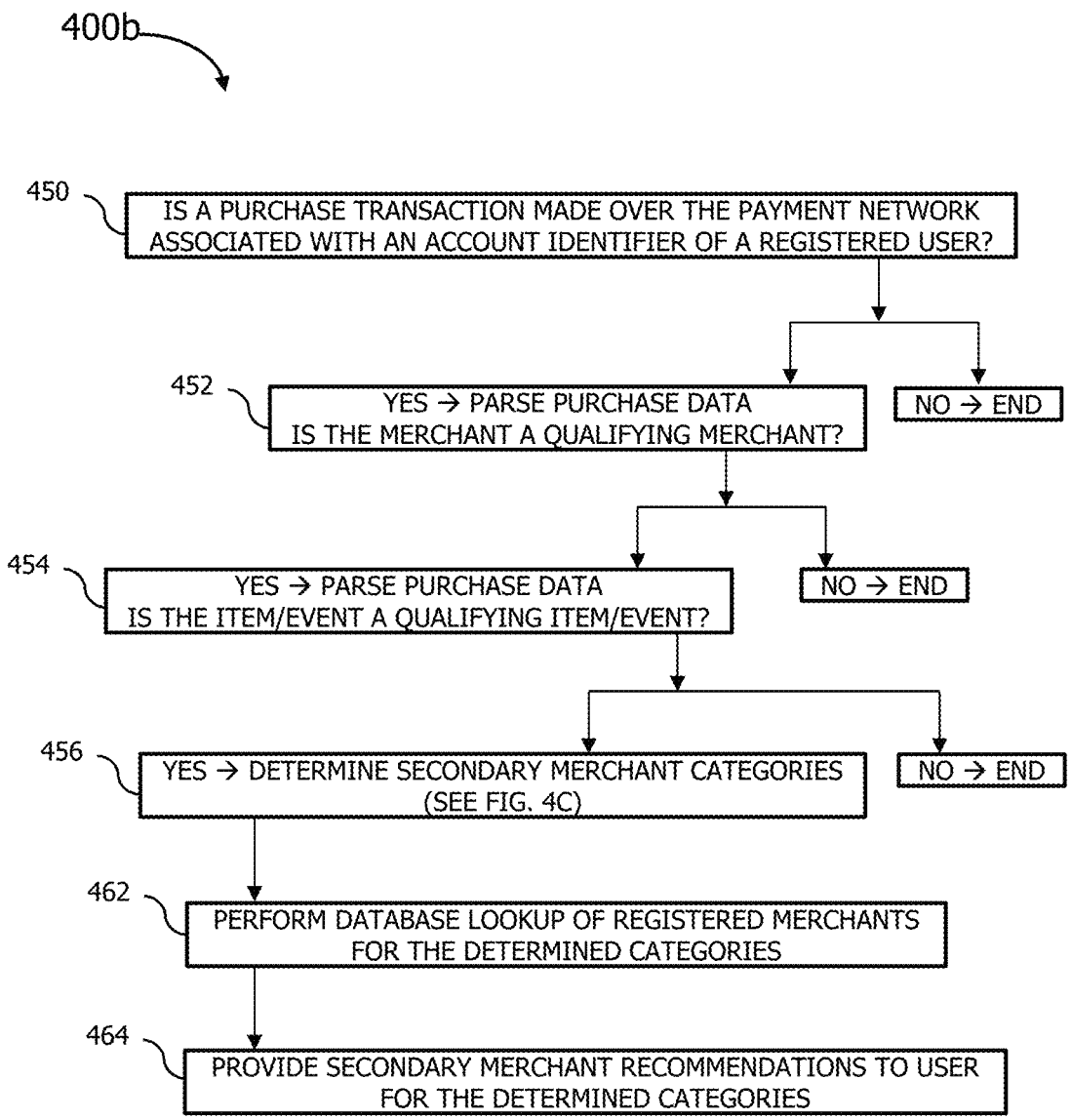
FIG. 4B is an example process flow diagram illustrating various steps performed by the ES computing device.

FIG. 4B is an example process flow diagram 400b illustrating various steps performed by ES computing device 402 and utilizing database 404 (shown in FIG. 4A). In the example embodiment, ES computing device 402 determines at step 450 whether a purchase transaction made over the payment network is associated with an account identifier of a registered user. When a purchase transaction is identified as being associated with an account identifier of a registered user at step 452, ES computing device 402 parses the purchase-related data to determine whether the merchant from whom the purchase was made is a qualifying merchant. For example, when a registered user has made a purchase from TicketMaster, that merchant would be determined to be a qualifying merchant since TicketMaster typically sells event-based items such as concert tickets, sporting event tickets, etc. However, as a further example, when a registered user has made a purchase from Starbucks, ES computing device 402 would determine that merchant to be an unqualified merchant because Starbucks (which typically sells food and drink items) does not typically sell event-based items. When the merchant is identified as a qualifying merchant at step 454, the purchase data is again parsed to determine whether the item is a qualifying item. For example, concert tickets would be determined a qualifying item because they are event-based. In some cases, however, the merchant is determined to be a qualifying merchant, but the purchased item is determined to be an unqualified item. For example, a user makes a purchase from the New York Yankees, and the merchant is determined to be a qualifying merchant because the New York Yankees sell baseball game tickets. Yet upon parsing the purchase-related data for item data, the item is determined to be an unqualified item, such as a jersey or other fan gear. Accordingly, in the example embodiment, ES computing device 402 first parses merchant-related data and filters registered user purchases initially by qualifying merchants. In other embodiments, ES computing device 402 may not first determine qualifying merchants, and initial determination of a qualifying purchase may be based on the item/item type only.

Figure 4C:
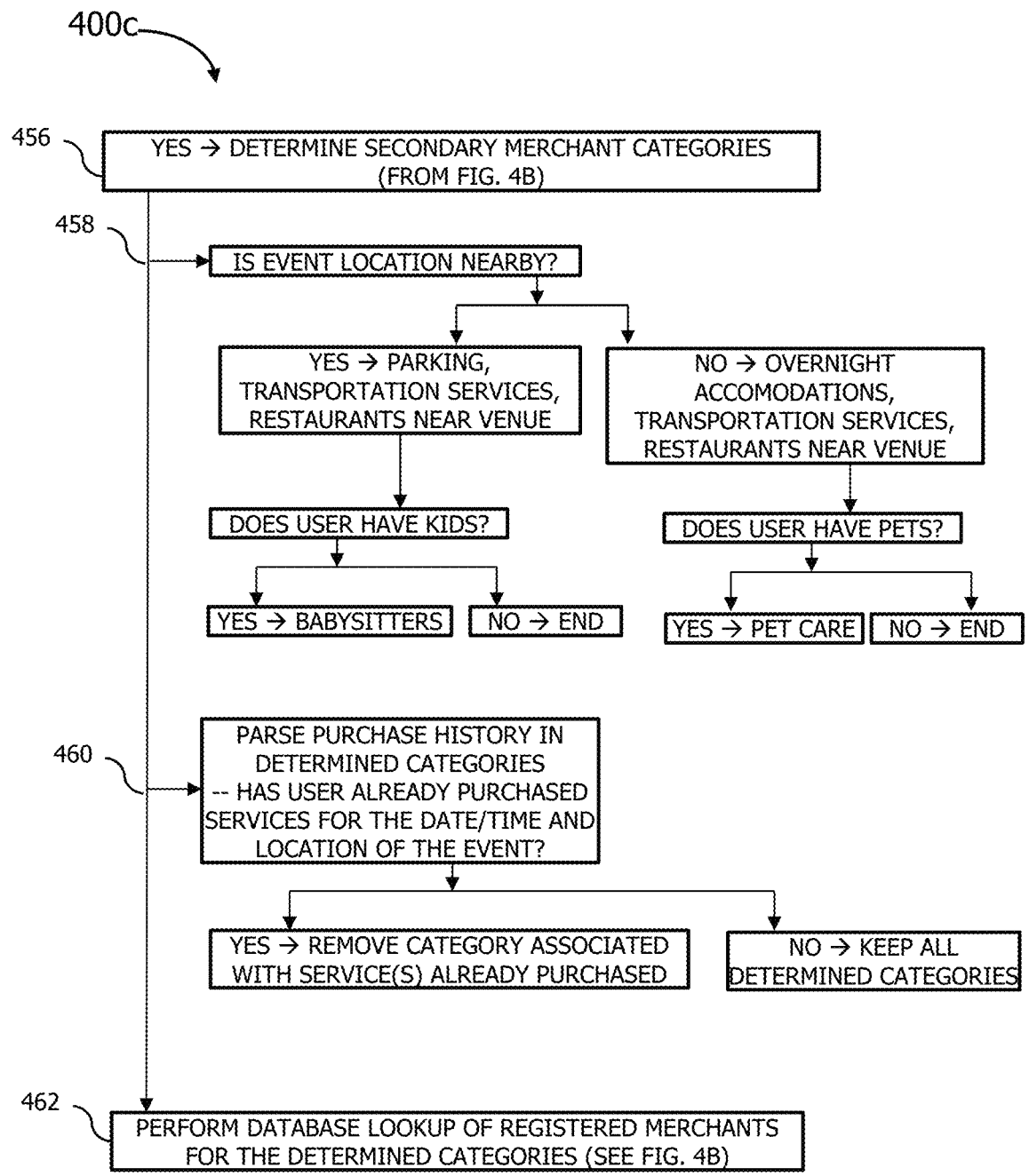
FIG. 4C is an example process flow diagram continuation of FIG. 4B illustrating various steps performed by the ES computing device.

Continuing with the example shown in FIG. 4B, once the purchased item has been determined to be a qualifying event-based item, ES computing device 402 will determine secondary merchant categories at step 456 (which is shown in expanded detail in FIG. 4C). Secondary merchant categories comprise the ancillary goods/services to be recommended to the user based at least on the primary, event-based purchase. Following secondary merchant category determination, ES computing device 402 will perform a database 404 lookup at step 462 to find and retrieve registered merchants 408 that are associated with each determined category. At step 464, ES computing device 402 then provides (e.g., by displaying to the user via a user interface) the secondary merchants 408 as recommendations to the user for each category. The user can subsequently make secondary purchases (that is, purchase ancillary goods/services) from the recommended secondary merchants 408.

FIG. 4C is an example process flow diagram continuation of FIG. 4B illustrating various steps 400c performed by ES computing device 402. Specifically, FIG. 4C describes determining secondary merchant categories (step 456) in greater detail. In the example embodiment, the user has purchased concert tickets. Since the purchase has been identified as a qualifying purchase (e.g., an event-based purchase), it is considered to be a primary purchase for which secondary merchants will be determined and provided. At step 458, ES computing device 402 will parse the purchase data to determine if the event location (e.g., the concert venue) is located nearby. ES computing device 402 will utilize various the data stored in database 404, including user profile data 424 and rules 426. A distance rule (or rules) in rules 426 will determine whether the concert venue is considered to be 'nearby' to the user's residence. For example, if a distance between the user's address and the concert venue is greater than 50 miles, 75 miles, or 100 miles, the event location may not be considered 'nearby'. If the event location is determined not to be nearby according to rules 426, then ES computing device 402 may identify overnight accommodations (such as hotel and Airbnb options) and transportation services (such as taxi services, and rental cars and parking options) to be applicable secondary merchant categories for the concert. Taxi services may include taxis, private driver services, Uber, Lyft, etc. If, on the other hand, the event location is determined to be nearby according to rules 426, then ES computing device 402 may identify parking options (e.g., public and private surface lots and garages) near the venue, as well as transportation services (such as taxi services). An applicable category would also be restaurants/dining options that are located within a certain distance of the concert venue. Distance rules included in rules 426 may be defined by the user at registration and/or may be defined automatically by ES computing device 402, depending on the embodiment. In the example embodiment, ES computing device 402 further identifies applicable secondary merchant categories by parsing the user profile data for various demographics 434, such as whether or not the user has children below a certain age that would require childcare on the date of the concert. If so, babysitting services proximal to the user's residence would be an applicable secondary merchant category. Similarly, user profile data 424 may indicate that the user has a pet (or pets). If the concert is not determined to be nearby, ES computing device 402 may include pet care or boarding services as an applicable secondary merchant category. In other embodiments, additional and/or alternative determinations and rules 426 may be made based on the primary purchase data 410, user profile data 424, and merchant profile data 425.

At step 460, ES computing device 402 will further parse user's purchase history 438 to determine whether the user has already purchased ancillary goods/services related to the primary purchase. Purchases made by the user that coincide with the date, time, and/or location of the primary purchase event may be identified. If a purchase falls into one of the determined merchant categories, then that particular category may be removed from the listing of determined categories prior to step 462 (also shown in FIG. 4B) in which ES computing device 402 performs a lookup of registered merchants for each determined category. For example, ES computing device 402 may identify in the user's purchase history that a hotel reservation has been made for a hotel proximal to the location of (e.g., in the same city as) the concert venue, and for the date of the concert. Consequently, ES computing device 402 will remove the 'overnight accommodations' category from the determined categories and will proceed to look up and retrieve specific secondary merchants for the remaining applicable categories. As another example, ES computing device 402 may identify in the user's purchase history that an Uber reservation has been made for the date of the concert and prior to the start time of the concert. Accordingly, ES computing device 402 will remove the 'taxi services' from the determined categories. If no applicable secondary purchases are found in the user's purchase history, then ES computing device 402 may keep all determined categories when performing a database lookup (step 462, also shown in FIG. 4B) for registered secondary merchants 408.

ES computing device 402 may further use rules 426 to incorporate user preferences 436 to determine and/or rank secondary merchant categories and/or specific secondary merchants. For example, upon registering with ES computing device 402, a user may indicate a preferred cuisine type to be used by rules 426 when determining restaurant merchants to recommend. As another example, a user may indicate a preference for rental cars over taxi services when an event is not nearby. Also, rules 426 may include a ranking hierarchy to be used when providing/recommending secondary merchants 408 to a user that includes giving recommendation priority to registered secondary merchants that the user has interacted with (e.g., purchased from) previously based on the user's transaction history.

According to the category determinations made in step 458, rules 426 will further determine the specific merchants (e.g., registered merchants) that correspond to each determined ancillary category by performing a lookup in database 404 (step 462, also shown in FIG. 4B). ES computing device 402 uses a unique combination of data and a unique analysis of the data in order to make the category and merchant determinations described herein. The process then proceeds to step 464, shown in FIG. 4B, of providing the secondary merchants as recommendations to the user for purchasing ancillary goods/services (secondary purchases) related to the primary purchase.

Figure 5:
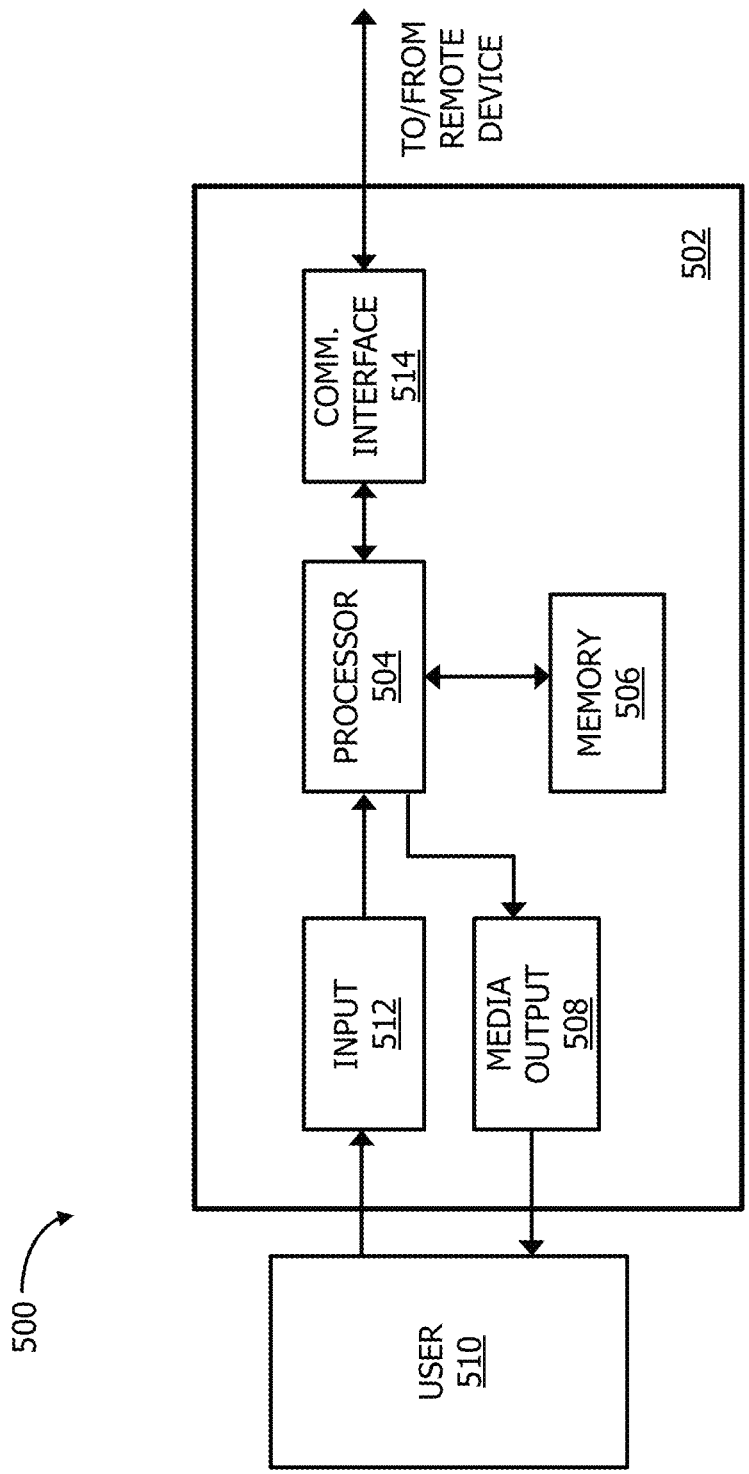

FIG. 5 depicts an exemplary configuration of a remote or client computing device 502, such as primary merchant 206, secondary merchant 208, and user 210 computing devices (shown in FIG. 2). Computing device 502 includes a processor 504 for executing instructions. In some embodiments, executable instructions are stored in a memory area 506. Processor 504 may include one or more processing units (e.g., in a multi-core configuration). Memory area 506 is any device allowing information such as executable instructions and/or other data to be stored and retrieved. Memory area 506 may include one or more computer-readable media.

Client computing device 502 also includes at least one media output component 508 for presenting information to a user 510. Media output component 508 is any component capable of conveying information to user 510. In some embodiments, media output component 508 includes an output adapter such as a video adapter and/or an audio adapter. An output adapter is operatively coupled to processor 504 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 508 is configured to present an interactive user interface (e.g., a web browser or client application) to user 510.

In some embodiments, client computing device 502 includes an input device 512 for receiving input from user 510. Input device 512 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 508 and input device 512.

Computing device 502 may also include a communication interface 514, which is communicatively coupleable to a remote device such as ES computing device 202 (shown in FIG. 2). Communication interface 514 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 506 are, for example, computer-readable instructions for providing a user interface to user 510 via media output component 508 and, optionally, receiving and processing input from input device 512. A user interface may include, among other possibilities, a web browser and client application. Web browsers enable users 510 to display and interact with media and other information typically embedded on a web page or a website from a web server associated with, for example, a merchant. A client application allows users 510 to interact with a server application associated with, for example, ES computing device 202 and/or other components of EBMT system 200 (shown in FIG. 2).

Figure 6:
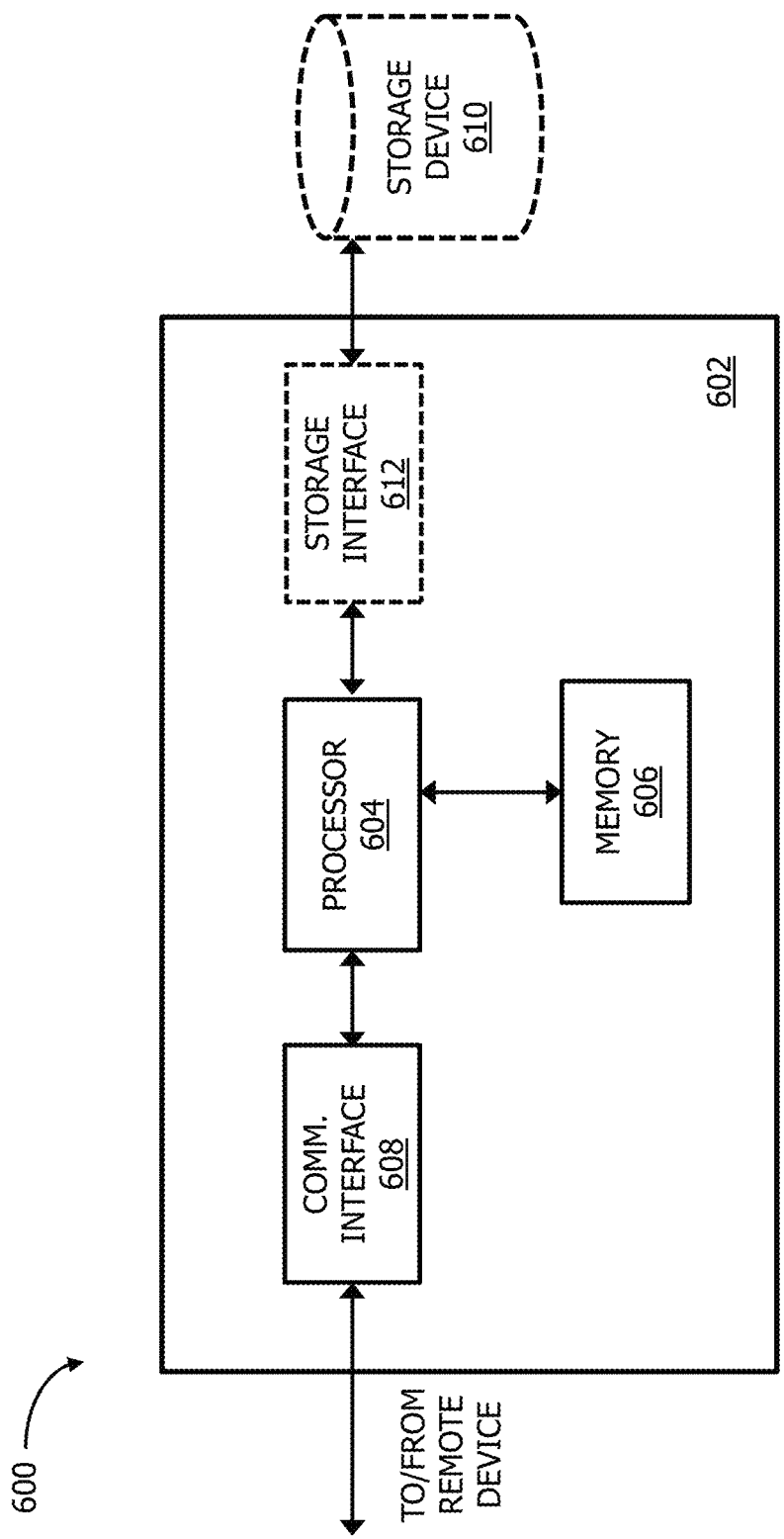

FIG. 6 illustrates an example configuration of a server computing device 602, such as ES computing device 202 and payment network 212 (shown in FIG. 2). Server computing device 602 includes a processor 604 for executing instructions. Instructions may be stored in a memory area 606, for example. Processor 604 may include one or more processing units (e.g., in a multi-core configuration).

Processor 604 is operatively coupled to a communication interface 608 such that server computing device 602 is capable of communicating with a remote device such as computing device 502 shown in FIG. 5 or another server computing device 602. For example, communication interface 608 of ES computing device 202 may receive various data from primary merchant 206, secondary merchant 208, and user 210 computing devices via the Internet, as illustrated in FIG. 2. As another example, communication interface 608 of payment network 212 may receive authorization requests from ES computing device 202 to complete payment transactions initiated via EBMT system 200.

Processor 604 may also be operatively coupled to a storage device 610. Storage device 610 is any computer-operated hardware suitable for storing and/or retrieving data. In some embodiments, storage device 610 is integrated in server computing device 602. For example, server computing device 602 may include one or more hard disk drives as storage device 610. In other embodiments, storage device 610 is external to server computing device 602 and may be accessed by a plurality of server computing devices 602. For example, storage device 610 may include multiple storage units such as hard disks or solid state disks in a redundant array of inexpensive disks (RAID) configuration. Storage device 610 may include a storage area network (SAN) and/or a network attached storage (NAS) system.

In some embodiments, processor 602 is operatively coupled to storage device 610 via a storage interface 612. Storage interface 612 is any component capable of providing processor 604 with access to storage device 610. Storage interface 612 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 604 with access to storage device 610.

Memory areas 506 (shown in FIG. 5) and 606 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 7:
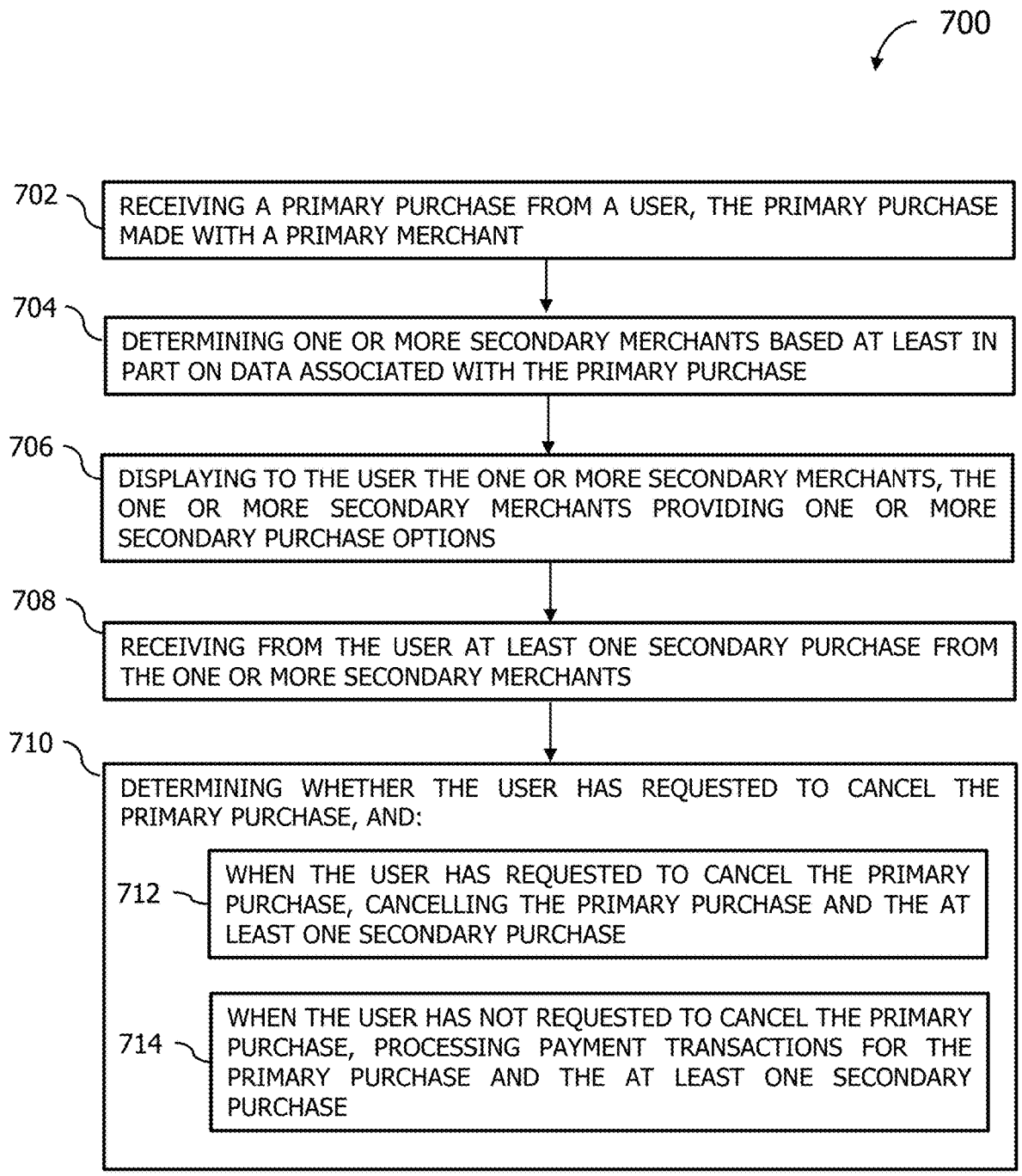

FIG. 7 is a flowchart of a method 700 for providing an event-based merchant targeting system, such as system 200 (shown in FIG. 2). In the example embodiment, method 700 is performed by an ES computing device, such as ES computing device 202 (shown in FIG. 2). In certain embodiments, method 700 may be at least partially performed by a different computing device. In other embodiments, method 700 may include additional, fewer, or alternative actions, including those described elsewhere herein.

Method 700 begins with the ES computing device receiving 702 a primary purchase from a user, the primary purchase made with a primary merchant, and determining 704 one or more secondary merchants based at least in part on data associated with the primary purchase. The ES computing device also displays 706 to the user the one or more secondary merchants wherein the one or more secondary merchants provide one or more secondary purchase options. The ES computing device further receives 708 from the user at least one secondary purchase from the one or more secondary merchants, and subsequently determines 710 whether the user has requested to cancel the primary purchase. When the user has requested to cancel the primary purchase, ES computing device cancels 712 the primary purchase and the at least one secondary purchase. When the user has not requested to cancel the primary purchase, ES computing device processes 714 payment transactions for the primary purchase and the at least one secondary purchase.

In some embodiments, method 700 further includes registration of users, primary merchants, and secondary merchants with the ES computing device. Merchant verification may be included in the registration process. In some embodiments, method 700 includes determining the one or more secondary merchants further based on based on a profile of the registered user. Additionally or alternatively, method 700 may include determining the one or more secondary merchants based on a location of the user, such as a geo-IP location, GPS location, or other suitable location tracking application. Depending on the embodiment, the determined one or more secondary merchants may be different from or the same as the primary merchant. For instance, if a particular merchant offers multiple ancillary goods/services for purchase that relate to the primary purchase, then a secondary merchant may be the same as the primary merchant. Similarly, in some embodiments, two or more secondary merchants may be the same as each other if there is a single merchant offering various applicable secondary purchases. In some embodiments, method 700 further includes cancelling payment transactions for both the primary and secondary purchases, and additionally or alternatively notifying the primary merchant and the one or more secondary merchants.

Figure 8:
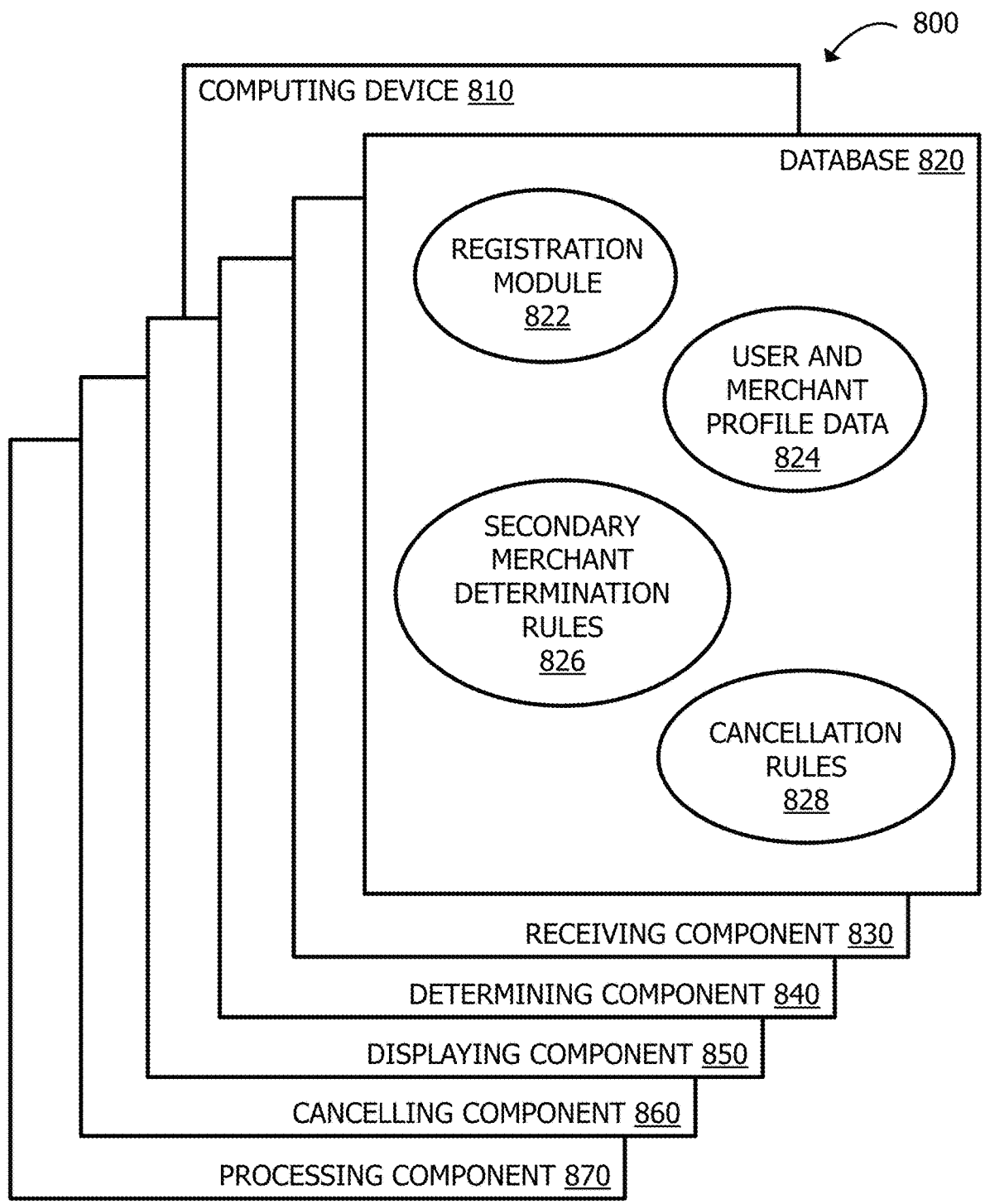

FIG. 8 is a diagram 800 of components of an example computing device 810 that may be used in method 700 shown in FIG. 7. In some embodiments, computing device 810 is similar to ES computing device 202 (shown in FIG. 2). Computing device 810 includes a database 820 configured to store various information. Database 820 may be similar to database 204 (shown in FIG. 2). Database 820 may be coupled with several separate components within computing device 810, which perform specific tasks. In the illustrated embodiment, database 820 is divided into a plurality of sections and stores, including but not limited to, a registration module section 822, a user and merchant profile data section 824, a secondary merchant determination rules section 826, and a cancellation rules section 828. Database 820 is interconnected to computing device 810 to receive, transmit, and/or update the information as required.

In the example embodiment, computing device 810 includes a receiving component 830 configured to receive a primary purchase from a user, wherein the primary purchase is made with a primary merchant. Computing device 810 further comprises a determining component 840 configured to determine one or more secondary merchants based at least in part on data associated with the primary purchase. Computing device 810 further includes a displaying component 850 configured to display to the user the one or more secondary merchants, the secondary merchants providing one or more secondary purchase options. Receiving component 830 is also configured to receive from the user at least one secondary purchase from the one or more secondary merchants. Determining component 840 is also configured to determine whether the user has requested to cancel the primary purchase. When determining component 840 determines that the user has requested to cancel the primary purchase, cancelling component 860 is configured to cancel the primary purchase and the at least one secondary purchase. When determining component 840 determines that the user has not requested to cancel the primary purchase, processing component 870 is configured to process the payment transactions for the primary purchase and the at least one secondary purchase.

Described herein are computer systems such as a payment processor (such as a payment network), a remote device (such as a primary merchant computing device, a secondary merchant computing device, and a user computing device) and an ES computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The terms database and memory, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 504, 604), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be included in payment data received by the ES computing device and used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the ES computing device are described herein as including general processing and memory devices, it should be understood that the ES computing device is a specialized computer configured to perform the steps described herein for providing an event-based merchant targeting system to target secondary merchants for presenting ancillary goods and/or services to a user based on a primary purchase made by the user at a primary merchant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An event servicing (ES) computing device including a processor in communication with a memory, said processor programmed to:

receive primary purchase transaction data for a captured event-based primary purchase transaction made by a user with a primary merchant via a digital wallet application executing on a client device of the user, wherein the primary purchase transaction data identifies an event, and wherein the ES computing device is in data communication with the digital wallet application executing on the client device;

determine, from a database subsequent to capture of the event-based primary purchase transaction, categories of ancillary goods or services usable in conjunction with the event identified in the primary purchase transaction data;

determine, from the database subsequent to capture of the event-based primary purchase transaction, one or more secondary merchants that offer the categories of ancillary goods or services;

transmit, to the one or more secondary merchants, at least one notification requesting availability data for the ancillary goods or services offered by the one or more secondary merchants;

receive, from the one or more secondary merchants, the availability data for the ancillary goods or services offered by the one or more secondary merchants;

transmit, to the digital wallet application executing on the client device to display to the user, one or more secondary purchase options for the ancillary goods or services based on the availability data received from the one or more secondary merchants;

receive, from the digital wallet application executing on the client device, secondary purchase transaction data for at least one captured secondary purchase transaction made by the user from the one or more secondary purchase options, wherein the captured event-based primary purchase transaction and the at least one captured secondary purchase transaction are separately captured transactions; and at a time subsequent to capture of the event-based primary purchase transaction and the at least one secondary purchase transaction, transmit, to the digital wallet application executing on the client device to display to the user, an aggregate view of the event-based primary purchase transaction and the at least one secondary purchase transaction, the aggregate view including a collective cancellation control, wherein said processor is further programmed to
cancel the event-based primary purchase transaction and the at least one secondary purchase transaction in response to an indication, via the digital wallet application executing on the client device, of a user selection of the collective cancellation control.

2. The ES computing device of claim 1, wherein the processor is programmed to determine the one or more secondary merchants based on a geo-IP location of the user.

3. The ES computing device of claim 1, wherein the user and the one or more secondary merchants are pre-registered with the ES computing device.

4. The ES computing device of claim 3, wherein the processor is programmed to determine the one or more secondary merchants by performing a lookup within a database based on a profile of the pre-registered user.

5. The ES computing device of claim 1, wherein the one or more secondary merchants are different from the primary merchant.

6. The ES computing device of claim 1, wherein the processor is programmed to cancel the captured event-based primary purchase transaction and the at least one secondary purchase transaction by cancelling transmission of a payment authorization request message for both the captured event-based primary purchase transaction and the at least one secondary purchase transaction.

7. The ES computing device of claim 1, wherein the processor is further programmed to, when the user has requested to cancel the captured event-based primary purchase transaction, automatically notify the primary merchant and the one or more secondary merchants of the cancellation by sending a notification to the primary merchant and the one or more secondary merchants.

8. A method for providing event-based targeted merchants, said method performed using an event servicing (ES) computing device including a processor in communication with a memory, said method comprising:

receiving primary purchase transaction data for a captured event-based primary purchase transaction made by a user with a primary merchant via a digital wallet application executing on a client device of the user, wherein the primary purchase transaction data identifies an event, and wherein the ES computing device is in data communication with the digital wallet application executing on the client device;

determining, from a database subsequent to capture of the event-based primary purchase transaction, categories of ancillary goods or services usable in conjunction with the event identified in the primary purchase transaction data;

determining, from the database subsequent to capture of the event-based primary purchase transaction, one or more secondary merchants that offer the categories of ancillary goods or services;

transmitting, to the one or more secondary merchants, at least one notification requesting availability data for the ancillary goods or services offered by the one or more secondary merchants;

receiving, from the one or more secondary merchants, the availability data for the ancillary goods or services offered by the one or more secondary merchants;

transmitting, to the digital wallet application executing on the client device to display to the user, one or more secondary purchase options for the ancillary goods or services based on the availability data received from the one or more secondary merchants;

receiving, from the digital wallet application executing on the client device, secondary purchase transaction data for at least one captured secondary purchase transaction made by the user from the one or more secondary purchase options, wherein the captured event-based primary purchase transaction and the at least one captured secondary purchase transaction are separately captured transactions; and at a time subsequent to capture of the event-based primary purchase transaction and the at least one secondary purchase transaction, transmitting, to the digital wallet application executing on the client device to display to the user, an aggregate view of the event-based primary purchase transaction and the at least one secondary purchase transaction, the aggregate view including a collective cancellation control, and wherein said method further comprises cancelling the event-based primary purchase transaction and the at least one secondary purchase transaction in response to an indication, via the digital wallet application executing on the client device, of a user selection of the collective cancellation control.

9. The method of claim 8, further comprising determining the one or more secondary merchants based on a geo-IP location of the user.

10. The method of claim 8, wherein receiving primary purchase transaction data for the captured event-based primary purchase transaction made by the user with the primary merchant comprises receiving primary purchase transaction data for the captured event-based primary purchase transaction made by a pre-registered user with the primary merchant, and wherein the pre-registration is with the ES computing device.

11. The method of claim 10, further comprising determining the one or more secondary merchants by performing a lookup in a database based on a profile of the pre-registered user.

12. The method of claim 8, wherein determining the one or more secondary merchants comprises determining the one or more secondary merchants that are different from the primary merchant.

13. The method of claim 8, wherein cancelling the captured event-based primary purchase transaction and the at least one secondary purchase transaction comprises cancelling transmission of a payment authorization request message for both the captured event-based primary purchase transaction and at least one secondary purchase transaction.

14. The method of claim 8, further comprising, when the user has requested to cancel the captured event-based primary purchase transaction, automatically notifying the primary merchant and the one or more secondary merchants of the cancellation by sending a notification to the primary merchant and the one or more secondary merchants.

15. A non-transitory computer-readable storage medium having computer-executable instructions embodied thereon, wherein when executed by an event servicing (ES) computing device including at least one processor coupled to a memory, the computer-executable instructions cause the ES computing device to:
- receive primary purchase transaction data for a captured event-based primary purchase transaction made by a user with a primary merchant via a digital wallet application executing on a client device of the user, wherein the primary purchase transaction data identifies an event, and wherein the ES computing device is in data communication with the digital wallet application executing on the client device;
- determine, from a database subsequent to capture of the event-based primary purchase transaction, categories of ancillary goods or services usable in conjunction with the event identified in the primary purchase transaction data;
- determine, from the database subsequent to capture of the event-based primary purchase transaction, one or more secondary merchants that offer the categories of ancillary goods or services;
- transmit, to the one or more secondary merchants, at least one notification requesting availability data for the ancillary goods or services offered by the one or more secondary merchants;
- receive, from the one or more secondary merchants, the availability data for the ancillary goods or services offered by the one or more secondary merchants;
- transmit, to the digital wallet application executing on the client device to display to the user, one or more secondary purchase options for the ancillary goods or services based on the availability data received from the one or more secondary merchants;
- receive, from the digital wallet application executing on the client device, secondary purchase transaction data for at least one captured secondary purchase transaction made by the user from the one or more secondary purchase options, wherein the captured event-based primary purchase transaction and the at least one captured secondary purchase transaction are separately captured transactions; and
- at a time subsequent to capture of the event-based primary purchase transaction and the at least one secondary purchase transaction, transmit, to the digital wallet application executing on the client device to display to the user, an aggregate view of the event-based primary purchase transaction and the at least one secondary purchase transaction, the aggregate view including a collective cancellation control, wherein the computer-executable instructions further cause the ES computing device to
- cancel the event-based primary purchase transaction and the at least one secondary purchase transaction in response to an indication, via the digital wallet application executing on the client device, of a user selection of the collective cancellation control.

16. The non-transitory computer-readable storage media of claim 15, wherein the computer-executable instructions cause the ES computing device to determine the one or more secondary merchants based on a geo-IP location of the user.

17. The non-transitory computer-readable storage media of claim 15, wherein the user and the one or more secondary merchants are pre-registered with the ES computing device.

18. The non-transitory computer-readable storage media of claim 17, wherein the computer-executable instructions cause the ES computing device to determine the one or more secondary merchants by performing a lookup within a database based on a profile of the pre-registered user.

19. The non-transitory computer-readable storage media of claim 15, wherein the computer-executable instructions cause the ES computing device to cancel the captured event-based primary purchase transaction and the at least one secondary purchase transaction by cancelling transmission of a payment authorization request message for both the captured event-based primary purchase transaction and the at least one secondary purchase transaction.

20. The non-transitory computer-readable storage media of claim 15, the computer-executable instructions further cause the ES computing device to, when the user has requested to cancel the captured event-based primary purchase transaction, automatically notify the primary merchant and the one or more secondary merchants of the cancellation by sending a notification to the primary merchant and the one or more secondary merchants.

* * * * *